United States Patent
Viehmann et al.

(10) Patent No.: US 12,288,050 B2
(45) Date of Patent: Apr. 29, 2025

(54) COMPILER FOR MACHINE LEARNING PROGRAMS

(71) Applicant: Grid.ai, Inc., New York, NY (US)

(72) Inventors: Thomas Viehmann, New York, NY (US); Luca Antiga, New York, NY (US); Michael Ruberry, New York, NY (US)

(73) Assignee: Grid.ai, Inc., New York, NY (US)

( * ) Notice: Subject to any disclaimer, the term of this patent is extended or adjusted under 35 U.S.C. 154(b) by 0 days.

(21) Appl. No.: 18/752,104

(22) Filed: Jun. 24, 2024

(65) Prior Publication Data

US 2024/0427576 A1    Dec. 26, 2024

Related U.S. Application Data

(60) Provisional application No. 63/522,550, filed on Jun. 22, 2023.

(51) Int. Cl.
*G06F 8/41*    (2018.01)
*G06F 8/30*    (2018.01)

(52) U.S. Cl.
CPC . *G06F 8/41* (2013.01); *G06F 8/31* (2013.01)

(58) Field of Classification Search
None
See application file for complete search history.

(56) References Cited

U.S. PATENT DOCUMENTS

| | | | | |
|---|---|---|---|---|
| 9,027,008 | B2* | 5/2015 | Ishizaki | G06F 8/443 717/145 |
| 2021/0103433 | A1* | 4/2021 | Kerr | G06F 8/41 |
| 2021/0232936 | A1* | 7/2021 | Tateishi | G06N 5/022 |
| 2022/0245057 | A1 | 8/2022 | O'Dowd et al. | |
| 2022/0414455 | A1* | 12/2022 | Collins | G06N 3/048 |
| 2023/0297337 | A1* | 9/2023 | Mohamed Awad | G06N 3/045 708/501 |
| 2023/0394328 | A1* | 12/2023 | Wei | G06N 5/022 |
| 2024/0045785 | A1* | 2/2024 | Kocberber | G06F 8/41 |
| 2024/0370239 | A1* | 11/2024 | Claudino Pereira Lopes | G06F 8/452 |

FOREIGN PATENT DOCUMENTS

WO    WO-2023278123 A1 *    1/2023    ............ G06F 8/41

OTHER PUBLICATIONS

"Understanding Jaxprs", The Jax Authors, https://jax.readthedocs.io/en/latest/jaxpr.html, May 3, 2020.
Wen, William, "Introduction to torch.compile", PyTorch, https://pytorch.org/tutorials/intermediate/torch_compile_tutorial.html#introduction-to-torch-compile, first downloaded May 30, 2023.

* cited by examiner

*Primary Examiner* — Ryan D. Coyer
(74) *Attorney, Agent, or Firm* — Jeffrey Schox; Diana Lin

(57) ABSTRACT

In variants, a program optimization method can include: receiving a program; determining a set of proxy inputs for the program; generating a set of intermediate traces for the program; and generating a set of execution traces for the program, wherein the set of execution traces can include executor fusions associated with device kernels for hardware accelerators. During runtime, program results can be computed by executing an execution trace instead of executing the program.

20 Claims, 15 Drawing Sheets

Expression language syntax

```
def fn(arg1: type, arg2: type, ..., **kwargs):
    out_var_1: type = symbol(arg1, arg2, ..., **kwargs)
    out_var_2: type = symbol(arg1, arg2, ..., **kwargs)
    ...
    return out_var_n
```

FIGURE 6

FROM FIG. 11A

```
# x_fc_1 = ltorch.linear(x, t_fc_1_weight, None)  # x_fc_1: "cuda:0 f32[2, 2048, 11008]"
# x_fc_1 = prims.linear(x, t_fc_1_weight, None)  # x_fc_1: "cuda:0 f32[2, 2048, 11008]"
del t_fc_1_weight
x_fc_2 = torch.nn.functional.linear(x, t_fc_2_weight, None)  # x_fc_2: "cuda:0 f32[2, 2048, 11008]"
# x_fc_2 = ltorch.linear(x, t_fc_2_weight, None)  # x_fc_2: "cuda:0 f32[2, 2048, 11008]"
# x_fc_2 = prims.linear(x, t_fc_2_weight, None)  # x_fc_2: "cuda:0 f32[2, 2048, 11008]"
del x, t_fc_2_weight
[result] = nvFusion0(x_fc_1, x_fc_2)
  # t9 = prims.neg(x_fc_1)  # t9: "cuda:0 f32[2, 2048, 11008]"
  # t10 = prims.exp(t9)  # t10: "cuda:0 f32[2, 2048, 11008]"
  # t11 = prims.add(1.0, t10)  # t11: "cuda:0 f32[2, 2048, 11008]"
  # t12 = prims.reciprocal(t11)  # t12: "cuda:0 f32[2, 2048, 11008]"
  # a = prims.mul(x_fc_1, t12)  # a: "cuda:0 f32[2, 2048, 11008]"
  # result = prims.mul(a, x_fc_2)  # result: "cuda:0 f32[2, 2048, 11008]"
del x_fc_1, x_fc_2
t18 = torch.nn.functional.linear(result, t_proj_weight, None)  # t18: "cuda:0 f32[2, 2048, 4096]"
# t18 = ltorch.linear(result, t_proj_weight, None)  # t18: "cuda:0 f32[2, 2048, 4096]"
# t18 = prims.linear(result, t_proj_weight, None)  # t18: "cuda:0 f32[2, 2048, 4096]"
del result, t_proj_weight
return t18
``` executor fusion definition

FIGURE 11B

Executor definition of fusion operation

```
def nvfuser_fusion_id0(fd : FusionDefinition) -> None :
    T0 = fd.define_tensor(shape=[-1, -1], contiguity=[True, True], dtype=DataType.Float, is_cpu=False, stride_order=[1, 0])
    T1 = fd.define_tensor(shape=[-1, -1], contiguity=[True, True], dtype=DataType.Float, is_cpu=False, stride_order=[1, 0])
    T2 = fd.ops.add(T0, T1)
    T3 = fd.ops.mul(T2, T1)
    fd.add_output(T2)
    fd.add_output(T3)
```

CUDA code for fusion

```
__global__ void nvfuser_pointwise_f0_c1_r0_g0(Tensor<float, 2, 2> T0, Tensor<float, 2, 2> T1, Tensor<float, 2, 2> T6, Tensor<float, 2, 2> T3) {
  nvfuser_index_t i0;
  i0 = ((nvfuser_index_t)threadIdx.x) + (128LL * ((nvfuser_index_t)blockIdx.x));
  if ((i0 < (T0.logical_size[0LL] * T0.logical_size[1LL]))) {
    float T5[1];
    T5[0] = 0;
    T5[0]
      = T1[i0];
    float T4[1];
    T4[0] = 0;
    T4[0]
      = T0[i0];
    float T2[1];
    T2[0]
      = T4[0]
      + T5[0];
    float T7[1];
    T7[0]
      = T2[0];
    T6[i0]
      = T7[0];
    float T8[1];
    T8[0]
      = T2[0]
      * T5[0];
    T3[i0]
      = T8[0];
  }
}
```

FIGURE 12

```
import torch, thunder
from thunder.tests.litgpt_model import GPT
from thunder import TensorProxy def apply_rope_impl(x: torch.Tensor, cos: torch.Tensor, sin: torch.Tensor) -> torch.Tensor:
    return litgpt.model.apply_rope(x, cos, sin)

def apply_rope_meta(x: TensorProxy, cos: TensorProxy, sin: TensorProxy) -> TensorProxy:
    return TensorProxy(like=x)

apply_rope = my_ex.register_operator('apply_rope', like=apply_rope_meta, fn=apply_rope_impl,
                                     replaces=litgpt.model.apply_rope)
```

Custom operator

FIGURE 13

COMPILER FOR MACHINE LEARNING PROGRAMS

CROSS-REFERENCE TO RELATED APPLICATIONS

This application claims the benefit of U.S. Provisional Application No. 63/522,550 filed 22 Jun. 2023, which is incorporated in its entirety by this reference.

TECHNICAL FIELD

This invention relates generally to the machine learning field, and more specifically to a new and useful compiler in the machine learning field.

BRIEF DESCRIPTION OF THE FIGURES

FIG. 6 is an illustrative example of an expression language syntax.

FIG. 12 includes illustrative examples of an executor definition for an executor fusion and the device kernel code corresponding to the executor fusion.

FIG. 13 is an illustrative example of defining a custom operator.

DETAILED DESCRIPTION

The following description of the embodiments of the invention is not intended to limit the invention to these embodiments, but rather to enable any person skilled in the art to make and use this invention.

1. Overview.

Figure 1:
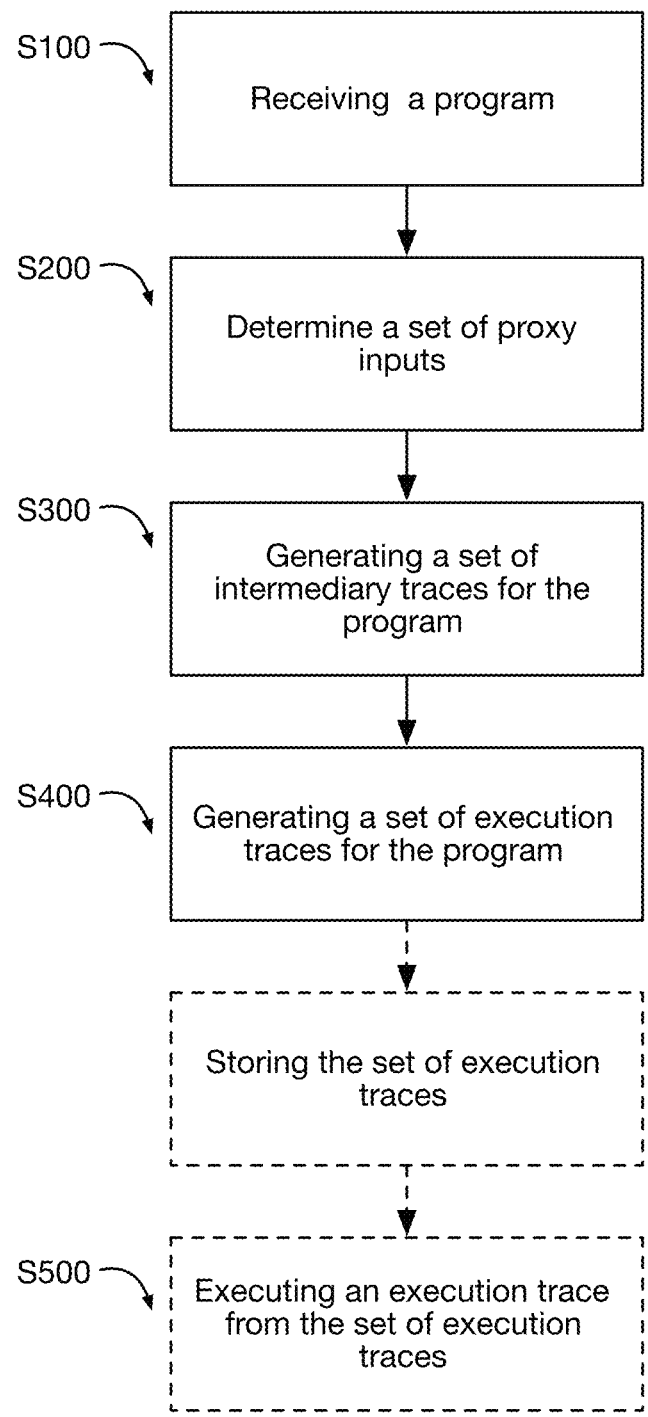
FIG. 1 is a schematic representation of a variant of the method.

In variants, the method can include: receiving a program S100; determining a set of proxy inputs for the program S200; generating a set of intermediate traces for the program S300; and generating a set of execution traces for the program S400. The method can optionally include: storing the set of execution traces; and executing an execution trace from the set S500 (example shown in FIG. 1). The compiler can function as a front-end compiler for machine learning frameworks (e.g., deep learning frameworks), which can express deep learning programs using a set of simplified expressions for easier transformation, easier optimization, easier maintenance, easier debugging, and faster execution.

Figure 2:
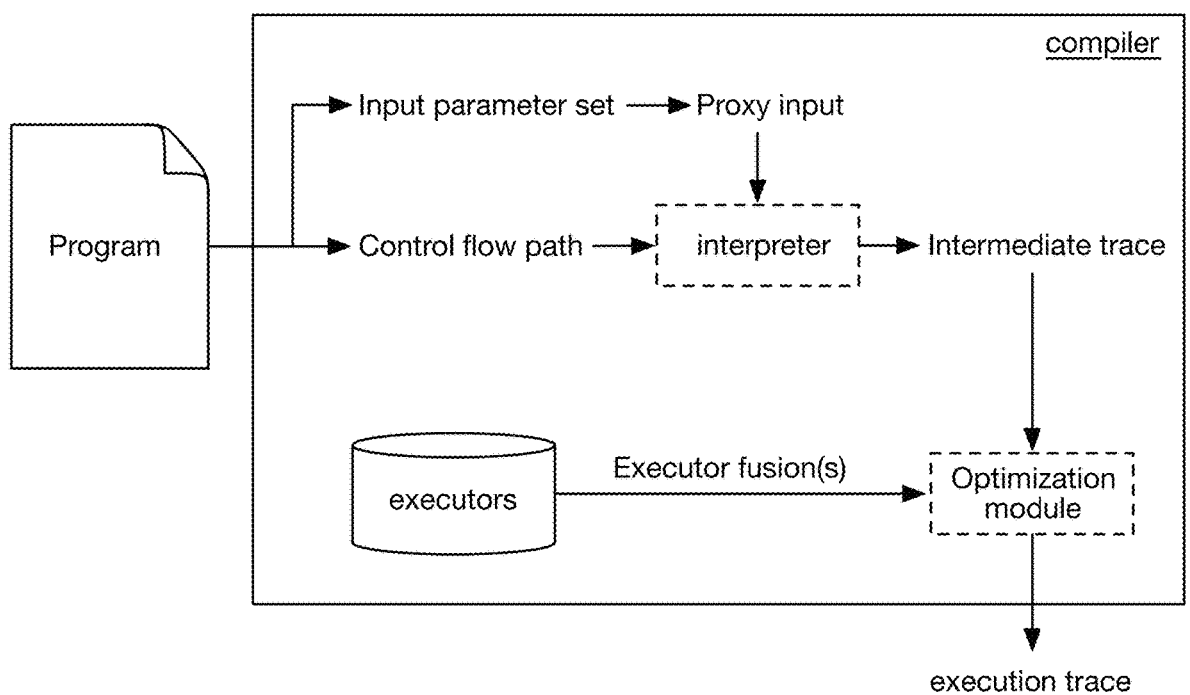
FIG. 2 is a schematic representation of a variant of the system.
Figure 8:
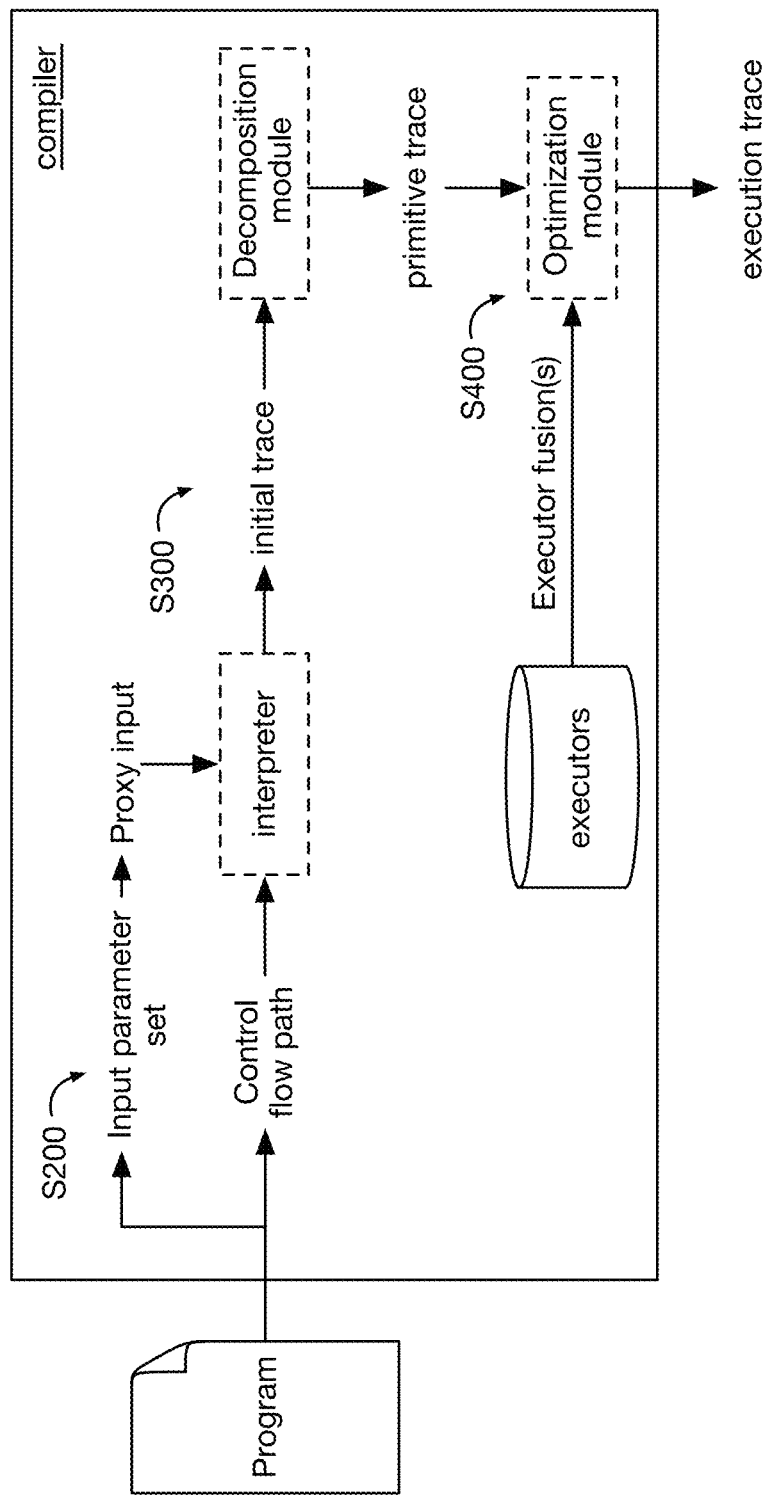
FIG. 8 is a schematic representation of an example compiler that generates an initial trace of a program (e.g., of a control flow path of the program), decomposes the initial trace into a primitive trace, and optimizes the primitive trace into the execution trace.

In an illustrative example, (e.g., examples of which are shown in FIG. 2 and FIG. 8), the compiler can: receive a program; generate a sequential trace of primitive operations from the program, optionally using a set of proxy inputs sharing input parameters with the program input (e.g., meta functions, tensor parameters, etc.) but lacking data values; optionally transform the trace (e.g., by applying a set of machine learning program transformations to the primitive operations); optionally optimize the trace by replacing subsets of primitive operations within the trace with executor calls (e.g., to device kernels, such as a CUDA kernel); and executing the resultant execution trace in lieu of the program during runtime. The program, execution trace, and/or intermediary traces can be in a shared expression language or formal language, such as Python (e.g., wherein the compiler can be a source-to-source compiler). The execution trace and/or program analysis can be generated statically (e.g., without executing the program, without using inputs with data values). The resultant execution trace can include executor calls to one or more hardware executors (e.g., machine learning functions, device kernels). In a specific example, an execution trace can combine and use different hardware executors, leveraging the most performant executor for each primitive operation set. The compiler can generate a plurality of execution traces, wherein each execution trace can be specific to a different control flow or program path. The execution trace can lack control flow, such that execution trace execution can perform the computation in a single function without control flow. The resultant execution trace can compute (e.g., up to numerical accuracy) the same results as the original program.

In specific examples, generating the sequential trace can include: reading a module (e.g., machine learning model) or function as bytecode, interpreting the bytecode using an interpreter, generating a sequential trace of higher-order operations on tensors and numbers, and decomposing the higher-order operations into primitive operations to generate the sequential trace of primitive operations.

In specific examples, transforming the trace can include: obtaining a grad of the trace, optionally inserting cast operations for running at lower precision, optionally applying custom transformations to the trace, optionally quantizing computation, and optionally inserting distributed computing calls (e.g., DDP, FSDP, PP, TP, etc.) into the trace. In variants, each primitive operation includes its own transformation rule for each machine learning program transformation, wherein transforming the trace includes applying the respective transformation rule for the respective machine learning program transformation.

However, the method can be otherwise performed.

2. Technical Advantages.

In variants, the technology can confer benefits over conventional systems.

Figure 14A:
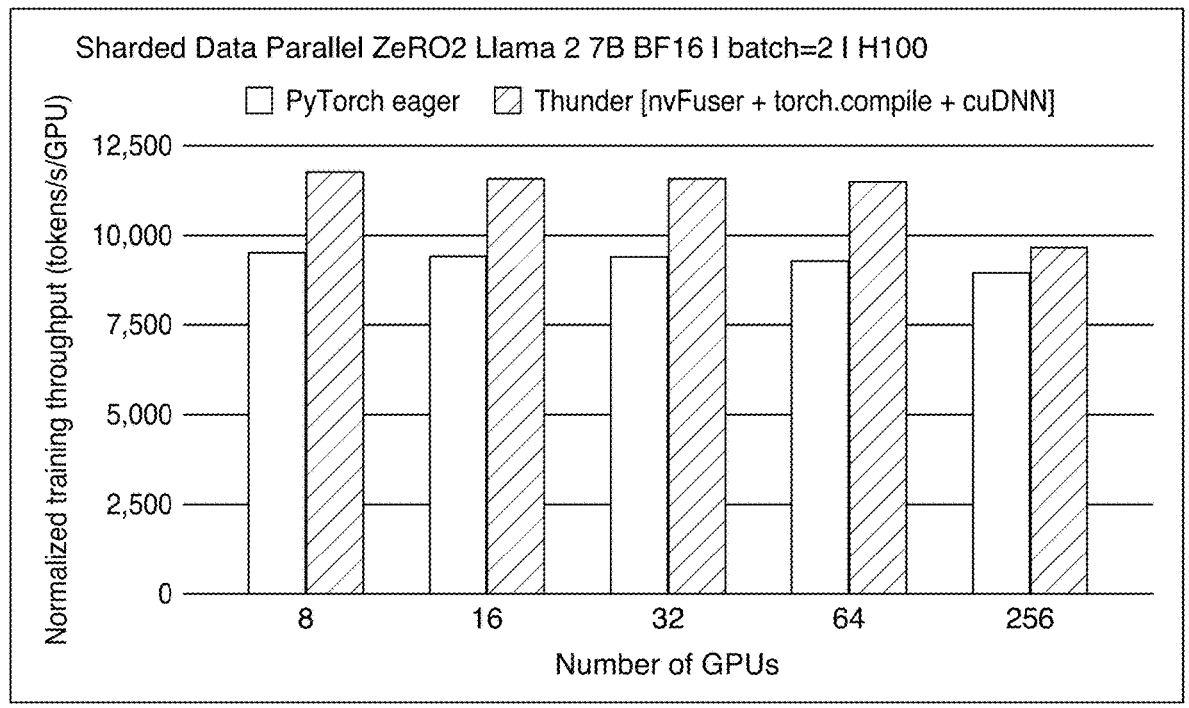
FIG. 14A is an experimental result of pretraining throughput for Llama 2 7B, comparing the pretraining throughput using only PyTorch eager versus the pretraining throughput using a variant of the compiler described herein with different combinations of executors (e.g., nvFuser and torch.compile; nvFuser, torch.compile, and cuDNN; nvFuser, torch.compile, and TE fp8amp).
Figure 14B:
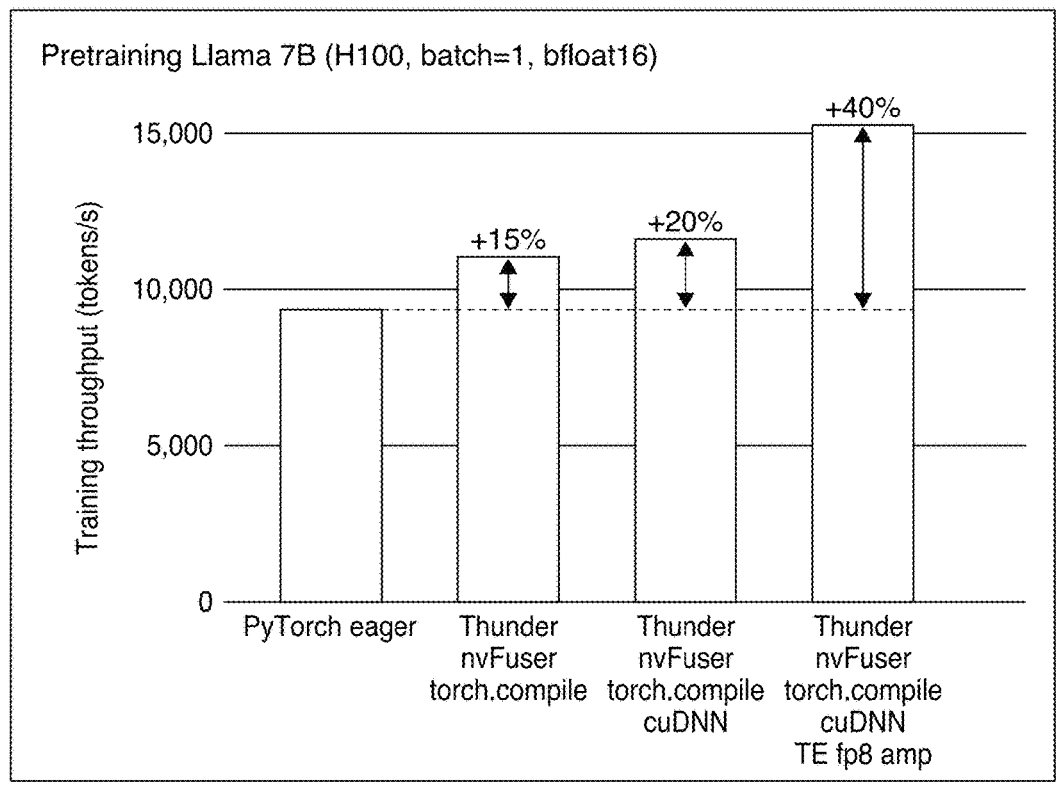
FIG. 14B is an experimental result displaying the normalized throughput measured for Llama 2 7B, comparing the throughput using only PyTorch eager versus the throughput using a variant of the compiler described herein.

First, variants of the technology can compute the same results as the program (e.g., up to numerical accuracy), while being substantially faster and more efficient, particularly for machine learning applications (e.g., training and/or inference); examples of experimental results are shown in FIG. 14A and FIG. 14B. In examples, the technology can achieve up to 40% faster execution than executing the source program. This can be enabled by executing execution traces that are generated from the source program, in lieu of executing the source program. This can make execution faster and/or more efficient in several ways. First, the execution traces can be linear, represent a single path, and not include control flow, which reduces runtime overhead in evaluating control flow and alternative paths. Second, the intermediate trace and/or execution trace can use a limited set of primitive operations (e.g., low-level operations, such as sum, difference, multiply, divide, broadcast, etc.) to represent the entirety of the source program path. This can reduce the execution time of short-lived operations and/or reduce overhead from runtime. Third, the execution trace can include executor calls (e.g., device kernel calls) to one or more executors (e.g., cuDNN, torch.compile, nvFuser, SDPA flash attention, etc.) in lieu of a chunk of primitive operations within the execution trace. In a specific example, eager operations (e.g., eager PyTorch operations) can be replaced with calls to faster executors. In another specific example, a single execution trace can include executor calls to multiple executors, wherein the best executor (e.g., fastest, most memory efficient, lower buffer allotment, highest priority, etc.) is used in lieu of each chunk of replaceable primitive operations. In another specific example, an execution trace can allocate operations to the best hardware accelerators (e.g., GPU, IPU, TPU, etc.) for a given primitive operation chunk by replacing the primitive operation chunk with an executor call to said accelerator. In variants, this can fuse pipelined operations to reduce memory overhead. Fourth, machine learning training and inference involves iteratively reexecuting the same operations. Since an execution trace is slightly faster and/or more efficient than the source program, using an execution trace instead of the source program during training and inference loops will drastically improve the overall speed and memory usage in aggregate. However, variants of the technology can otherwise enable faster and/or more efficient program output determination.

Second, unlike conventional compilers, variants of the technology are capable of handling tensor inputs, tensor operations, and tensor outputs, which can vary in size, shape, type, and/or other parameters between different runs or iterations. This variation can cause variations in control flow and associated operations. In variants, the technology can handle tensors by tracing the program using proxy inputs that have the same metadata (input parameters) as the program inputs, but lack actual data values. For example, generating the execution trace can include: determining the metadata of the program's inputs (e.g., size, shape, type, other input parameters, etc.), generating a proxy input for each input metadata set (input parameter set), and determining an execution trace for each input metadata set using the respective proxy input. The traces are then cached with the input metadata set. During runtime, the execution trace for the input metadata set matching the runtime input's metadata set is retrieved and executed. In variants, this can enable the execution trace to be specialized for known tensor shapes, which can allow for more aggressive constant propagation. However, tensor inputs and operations can be otherwise handled.

Third, variants of the technology can generate traces that are easily understood, directly executable, and directly inspectable by generating traces in a formal language (e.g., programming language, expression language, etc.). For example, all traces, such as the intermediate traces and executable trace, can be in Python or the same language as the source program. In variants, the compilation context can also be in the same language (e.g., be a Python context). This can enable users familiar with the source program's language to be able to: read the trace, extend the executable trace (e.g., add or remove new operations, transformations, kernels, operators, etc.), directly execute the execution trace (e.g., which can facilitate debugging and profiling), inspect the objects referenced by the program (e.g., because the objects are live Python objects), extract and analyze different portions of the trace, use existing language-specific tools (e.g., Python tools) for introspection and analysis, and/or confer other benefits. This can also enable the executable traces to be fully interoperable with other programs written in the programming language and/or libraries for the programming language. This can also cause the execution trace to reference live Python objects, which can be directly inspected. However, generating traces and contexts in the same programming language can have other advantages.

Fourth, variants of the technology can disassemble and analyze the computer program statically instead of dynamically. Since machine learning frameworks tend to be large and complex, static analysis can enable bugs to be found earlier on in the development process, using more rigorous techniques (e.g., to find bugs that are caused by code that will not always be exposed during dynamic execution), with higher efficiency (e.g., less overall computational resource consumption) as compared to purely dynamic analysis.

Fifth, variants of the compiler can disassemble the entire program, instead of relying on frame objects. This can enable the disassembled program representation to retain the same information as the original program, without losing any information (e.g., be convertible back to the original program). The disassembled program representation can also represent all possible paths through a program, not just the branch currently being executed (e.g., which can be specific to a particular set of inputs).

Sixth, variants of the compiler can trace operations at both the semantic level (e.g., high level operations, such as attention) and the primitive level (e.g., the most granular operations that a high level operation is broken down into, such as matmuls for attention), which can enable a statically-typed expression language with limited higher-order features to be used. In variants, the expression language can, in turn, be in the original program's language (e.g., when the program is in Python, the expression language is in Python). This can enable language-specific tools (e.g., debuggers, introspection tools, standard IDE facilities, etc.) to be used by the programmer to understand the simplified program expression without needing to learn another programming language, and can enable the simplified intermediate representation (e.g., in the expression language) to be easily reverted to human-readable code.

Seventh, variants of the compiler can use both semantic transforms and optimizing transforms to simplify the program (e.g., expressed in the expression language) more efficiently.

However, further advantages can be provided by the system and method disclosed herein.

3. System.

The compiler functions to generate a set of optimized traces for a computer program. The compiler is preferably a source-to-source deep learning compiler, but can be any other compiler. The compiler preferably generates the set of optimized traces using the method described below, but can otherwise generate the traces. The compiler is preferably a Python compiler, more preferably a PyTorch compiler, but can additionally or alternatively be another compiler.

The compiler can include a set of primitive operators ("primitives") that represents an atomic or terminal expression or operation (e.g., an operation that cannot be decomposed into smaller operators). The primitive operators preferably do not broadcast (unless the primitive is a broadcast primitive), do not type promote, and do not have default arguments, but can additionally or alternatively broadcast, type promote, and/or include default arguments. The compiler preferably uses a limited set of primitive operators, but can alternatively use a dynamic set of primitive operators. The primitive operators are preferably predefined and compiler-standard, but can alternatively be custom primitives. Examples of primitive operations include: add, difference, multiply, divide, broadcast, linear, exponential, reciprocal, amax, and/or other operations. The primitive operators are preferably used to represent higher-level program operations in the traces, but can be otherwise used. The compiler's transformations and optimizations are preferably based on the primitive operators (e.g., use the primitive operators as the core language), but can alternatively use another program representation. However, the primitive operations can be otherwise configured.

In variants, each primitive operator or set thereof can be associated with a set of transformation rules for each of a set of machine learning program transformations ("program transformations"). Examples of ML program transformations ("program transformations") can include: grad, fusions, distributions (e.g., DDP, FSDP, etc.), functionals (e.g., VMAP, VJP, JVP, etc.), and/or other transformations. In operation, a set of primitive operations can be transformed using the transformation rule for a given transformation that is applied to the program segment (e.g., lines of code) represented by the set of primitive operations. However, ML program transformations can be otherwise applied to the primitive operations.

Figure 7:
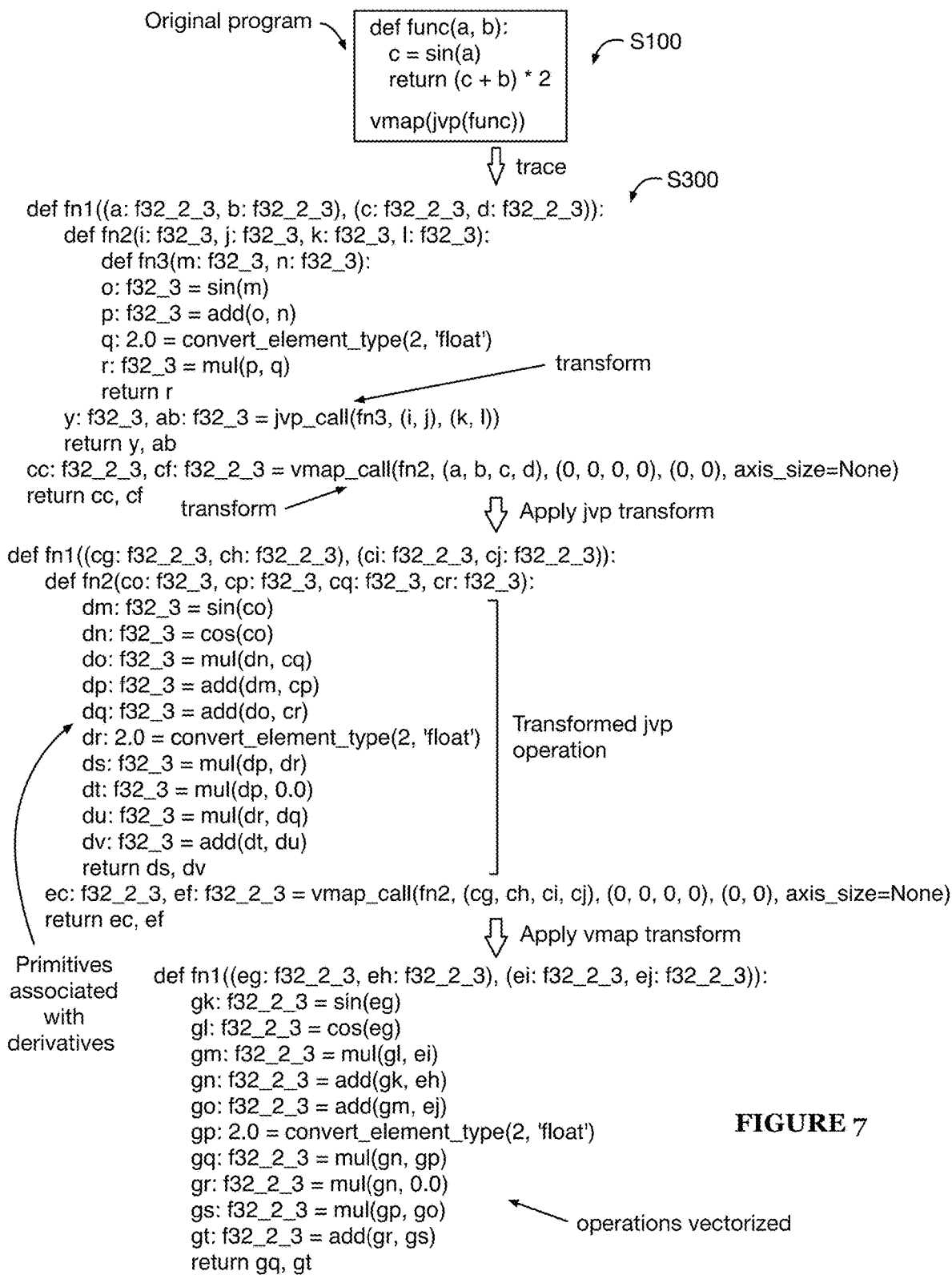
FIG. 7 is an illustrative example of semantically transforming a program.

In a specific example, the traces can be expressed in an expression language (e.g., be an expression language representation of all or a portion of the program), which can include a very narrow subset of the program's source language, but can alternatively be in a different language. For example, the expression language can be a narrow subset of valid Python syntax (e.g., a "pyexpr") when the program's source language is Python (e.g., examples shown in FIG. 6, FIG. 10, and FIG. 11). This can enable standard IDE facilities to be used for inspection, to understand how primitives are fused, to tap into profiling information, and/or for other functionalities. This can also enable the resultant code (e.g., the acquired program) to be understood at a glance (e.g., in contrast with conventional trace results), run and iterated manually (e.g., for debugging purposes), and to integrate the system with pdb to step through the resultant code and see it mapped to the original code. In an illustrative example, the trace or expression language can include a set of sequentially incremented standard variable names (e.g., a, b, c, etc.), each corresponding to the sequence of variables that are encountered in the original program. In another illustrative example, the expression language can encode the data object type of the data (e.g., using a platform-standard data object name, such as "f32"), the shape of the data (e.g., var_1_2 is an array with 1 row and 2 columns), and/or other data parameters in the variable name. In an illustrative example, the type annotations of the variable a: f32_2_3 can show that the variable "a" has a data object type corresponding to f32 and has a shape (e.g., 1_2, or 1 row 2 column); examples shown in FIG. 7, FIG. 10, and FIG. 11. These can be represented as scalars with no shape information. However, the expression language can be otherwise defined. The resultant code (e.g., the expression language representation) can be a program in A-normal form, but can alternatively have any other suitable form.

In variants, the compiler can also include a set of intermediate operators that function to represent higher-order operations (e.g., higher-level operations, ML operations, etc.). In variants, the interpreter is limited to the set of intermediate operators when interpreting a program into a trace (e.g., an initial trace); alternatively, the interpreter can use other operators. These intermediate operators can include higher-order operations that are typically output by a standard interpreter, wherein the higher-order operations can be nonatomic (e.g., can be broken down into lower-level operations), and can also include lower-level operations (e.g., terminal or atomic operations, similar to primitives); however, the intermediate operators can be otherwise defined. The intermediate operators (used for the higher-level operations) can include: programming language-standard operators (or equivalents thereof, such as "ltorch" operations), library-standard operators (or equivalents thereof), custom operators (e.g., example shown in FIG. 13), and/or other operators. Examples of intermediate operators include amax, exponential, true_divide, and/or other operators. In an illustrative example, the intermediate operators can be versions of PyTorch operators. Each intermediate operator is preferably associated with a set of primitive operators, but can alternatively be unassociated with primitive operators. In variants, this association between a intermediate operator and a set of primitive operators can enable a trace including intermediate operators can be converted (e.g., compiled) into a subsequent trace including only primitive operators. In variants, users can define custom operators by specifying: the operator name, the function (e.g., code set), meta function (e.g., metadata, input parameters, etc.), and/or other information. The user can also define the primitive decomposition for the custom operator (e.g., series of primitive operators that the custom operator decomposes into); alternatively the primitive decomposition can be automatically generated from the function.

The compiler can also include an interpreter that functions to convert the program (e.g., bytecode) to a custom set of intermediate operations, but can alternatively exclude an interpreter. In examples, the interpreter can construct a trace of operations (as an intermediate representation) that are performed on tensors or numbers (e.g., program inputs), whether the tensors or numbers originated from the interpreter or are external objects. The interpreter is preferably a predetermined interpreter for the programming language (e.g., CPython interpreter for a Python compiler), but can alternatively be a custom interpreter, an extended interpreter (e.g., for the programming language), and/or be any other interpreter). The interpreter can also be implemented in the program's formal language (e.g., also implemented in Python), or be implemented in another language. In an example, the interpreter can: disassemble a program or subset thereof (e.g., a module, a function, etc.) into bytecode; and interpret the bytecode using the interpreter to generate a sequential trace of operations (e.g., an initial trace) on the program inputs (e.g., tensors and numbers). The sequential trace of operations is preferably represented as a linear Python program free of control flow, but can alternatively be any other sequential representation.

The compiler can also include one or more executor fusions (e.g., executor operators, calls to device kernels, etc.), wherein executor fusions can be used to replace sets of primitive operations within a trace. In variants, the set of executor fusions can be generated by an executor fusion generator; however, the executor fusions can be received from device manufacturers, authored by third parties, and/or otherwise determined. In variants, the compiler does not directly generate code for computing devices (e.g., GPUS, TPUs, IPUS, NPUs, FPGAs, DSPs, etc.). Instead, the compiler can acquire and transform the user program into a standardized format, then select the optimal executor fusions (and associated executors) for primitive operation subsets or generate device code using an executor. However, the compiler can otherwise use executor fusions.

An executor fusion preferably computes the same results as the set of primitive operations (e.g., up to numerical accuracy), but can alternatively compute different results. An executor fusion preferably computes a machine learning operation (e.g., softmax, EBV, ReLU, convolution, pooling, normalization, attention, etc.), but can additionally or alternatively compute other operations. An executor fusion can include: a call to a device kernel, a set of machine instructions (e.g., device instructions, such as GPU instructions, TPU instructions, IPU instructions, CPU instructions, etc.), and/or be otherwise configured. The executor fusions can be predefined (e.g., by the compiler author, by the accelerator device manufacturer, etc.), manually defined, or otherwise determined.

Each executor fusion is preferably associated with an executor, but can alternatively be associated with multiple executors. The compiler can include executor fusions from multiple executors.

An executor functions to accelerate a computation on a given device (e.g., accelerator device) or device type by executing the computation using low-level machine instructions. Each executor can include a compiler or library to execute operations on a given device. Each executor can be associated with multiple executor fusions, or be associated with a single executor fusion. Examples of executors include: torch.compile; nvFuser; cuDNN; Apex; TransformerEngine; PyTorch eager; custom CUDA kernels (e.g., through PyCUDA, Numba, or CuPy); custom kernels written in OpenAI Triton; SPDA flash attention, Intel NPU accelerator library, Apex cross-entropy, Triton cross-entropy, TransformerEngine, and/or other executors.

Each executor can include or call one or more device kernels for each of a set of machine learning operations (e.g., be a library of device kernels for different ML operations). A device kernel (e.g., compute kernel, compute shader, etc.) can be a routine compiled for a device (e.g., high-throughput accelerators) or functions computing numerical operations on a device, wherein the device kernel is separate from but used by a main program (e.g., executing on a central processing unit), or be otherwise defined. An example of device kernel code is shown in FIG. 12. In variants, the device kernel is not an operating system kernel (e.g., core of a computer's operating system). Examples of device kernels can include CUDA kernels, OpenCL kernels, AMD ROCm kernels, Vulkan compute kernel, Intel OneAPI kernels, Intel NPU accelerator kernels, and/or other kernels. Each device kernel can include a set of machine instructions to execute the respective machine learning operation on one or more: device classes (e.g., GPU, TPU, IPU, NPU, etc.), device manufactures (e.g., Nvidia processing units, AMD processing units, Google processing units, etc.), device models, and/or set of devices. In an example, the device kernel can be a function that is run by a parallel computing platform and/or programming model that allows higher-order programs to use parallelized computing architectures (e.g., GPU, IPU, TPU, etc.) for general-purpose computing. However, the device kernels can be otherwise configured.

The executor fusion referencing a device kernel can be the same as the device kernel name and/or executor function name, but can alternatively be different from the device kernel name and/or executor function name. In the latter variant, the mapping between the executor fusion and the device kernel (and/or executor function) can be stored in the compilation context (e.g., example shown in FIG. 11), in an auxiliary resource, and/or otherwise stored and/or retrieved.

The compiler can be used to compile one or more computer programs (program). A computer program can include a sequence of instructions (programming instructions, code, code set, etc.) in a programming language that a computer can execute. The program is preferably human-readable, but can be not human readable. The program is preferably in Python, but can be in Prolog LISP, Java, C++, Clojure, and/or any other suitable programming language (e.g., formal language). In variants, the program can reference methods and/or libraries disclosed in U.S. application Ser. No. 17/741,028 filed 10-May-2022, U.S. application Ser. No. 17/748,743 filed 19 May 2022, U.S. application Ser. No. 17/833,421 filed 6 Jun. 2022, wherein each of which is incorporated herein in its entirety by this reference; however, the program can reference other methods, libraries, and/or frameworks.

Each program can include one or more inputs. An input can be a data object that represents the information supplied to the program, or be otherwise defined. A program input can include: tensors, numbers, and/or other input types. A program input can be associated with a set of input parameters, such as shape, device, dtype, whether the tensor requires grad or not (grad requirements), and/or other input parameters. During runtime, a program input can also be associated with data values (e.g., values for index positions within a vector or matrix). However, the inputs can be otherwise configured.

Figure 3:
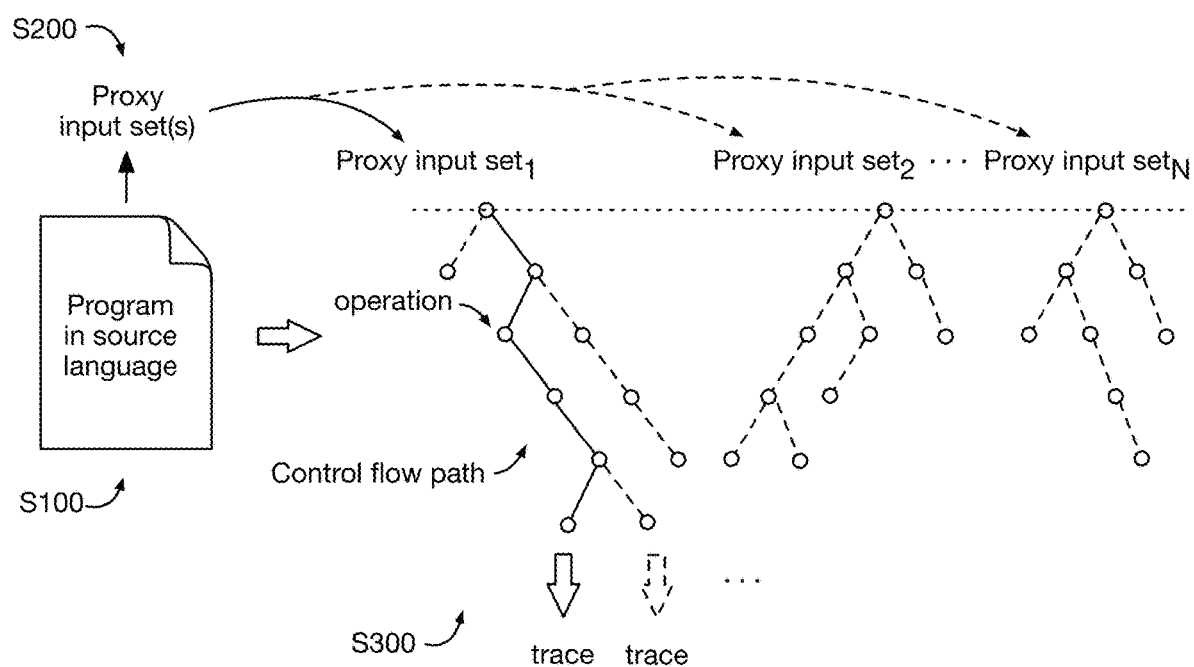
FIG. 3 is an illustrative example of intermediate representations of the same example program, using different proxy input sets.

Each program can include one or more control flow paths, which functions to define the order in which individual statements, instructions, or function calls within the program are executed or evaluated. The control flow paths (e.g., logical branches) can be defined by the control flow within the program, or be otherwise defined. An example is shown in FIG. 3. The control flow can include a series of choices or branches that can be made at different points during the program execution, or be otherwise defined. Examples of program statements that represent or result in control flow can include: continuations at different statements, conditionals, loops, distant statements (e.g., subroutines, coroutines, continuations, calls to third party programs, etc.), unconditional halts, and/or other control flow statements. Each control flow path preferably represents a single control flow branch (e.g., a single set of decision values), but can alternatively represent multiple control flow branches (e.g., multiple sets of decision values). In the latter variant, the control flow path can optionally include control flow.

Different control flow paths can be associated with different inputs, or be associated with the same inputs. The different inputs for different control flow paths are preferably associated with different input parameters (e.g., different size, shape, dtype, etc.; example shown in FIG. 3), but can alternatively be associated with the same input parameters.

Different control flow paths are preferably associated with different traces (e.g., intermediate trace set, execution trace, etc.; example shown in FIG. 3), but can alternatively be associated with a common, shared trace. Each trace preferably represents a single control flow path, but can alternatively represent multiple control flow paths. Each trace preferably does not include control flow within the trace; alternatively, each trace can include control flow within the trace. However, the control flows and control flow paths can be otherwise represented.

In variants, the program can include or reference machine learning modules or functions. A machine learning module can include one or more blocks of code, and can have variable functionality (e.g., perform multiple tasks), or be otherwise defined. A machine learning module is preferably a machine learning model, more preferably a predetermined machine learning model (e.g., llama™, GPT4™, Claude™, etc.), but can alternatively be a custom ML model, a fine-tuned ML model (e.g., with different weights, biases, layers, connections, etc. from the generic model), include a set of functions (e.g., that includes or iterates over ML operations; a collection of functions, etc.), or be otherwise configured. A function can include a small block of code, can be separable from the rest of the code, and can have a fixed functionality, or be otherwise defined. A function can be a predetermined function from a predetermined library, a custom function (e.g., authored by the user), code that does not include machine learning operations (e.g., pooling, softmax, etc.), and/or be otherwise configured.

The compiler can generate one or more traces for a given computer program. A trace is preferably a linear representation of the program, more preferably a linear representation of a control flow path from the program, but can alternatively be a nonlinear representation of the program, or be otherwise defined. A trace preferably does not include control flow (e.g., conditional statements, loops, etc.), but can alternatively include control flow. A trace is preferably a single function (e.g., without control flow), but can alternatively be multiple functions and/or be otherwise constructed.

The compiler preferably generates the set of traces for a given program once, but can alternatively generate the set of traces for a program multiple times. The set of traces is preferably generated before program execution with real inputs (e.g., computation), but can alternatively be generated during program computation, after program computation, or generated at any other suitable time. In examples, the set of traces are pregenerated and used in lieu of the program each time the program is called (e.g., for each program execution iteration, etc.).

Each trace is preferably, itself, a program, but can alternatively be an operational graph or set thereof, a logical branch within an operational graph, or be otherwise configured. The set of traces are preferably in a programming language, more preferably in the same programming language as the source program, but can alternatively be in a different programming language, in machine language (e.g., be machine code), assembly, object code, markup, and/or be otherwise represented. For example, the traces can be in Python. This can enable conventional tools that have already been built for the programming language to be used to introspect, transform, optimize, debug, and/or otherwise analyze the traces. The traces can be stored as: programs, executable files, and/or otherwise stored.

Each trace can accept one or more inputs. A trace is preferably specific to a set of input parameters (e.g., input parameter values, input metadata values, etc. for one or more of the trace inputs), but can alternatively be associated with multiple sets of input parameter values. For example, a trace can be associated with a set of inputs having predetermined shapes, sizes, dtype, and grad requirements, wherein a different set of inputs having different input parameters can be associated with a different trace.

Each trace (e.g., series of operations performed on a set of inputs) is preferably generated using a set of proxy inputs (e.g., proxy tracing), such that a trace is generated without dealing with an actual program input (e.g., tensor). In variants, this can enable the program to be traced without performing any computation on the computing devices (e.g., no accelerator computation is performed during program interpretation and/or execution for tracing), which can speed up tracing and reduce overall cost. A proxy input is preferably a data object with the same input parameters as the program input (e.g., metadata, parameter values, metadata values, etc.), but lacks data values. However, a proxy input can be otherwise defined. Examples of input parameters can include: shape, size, dtype, grad requirements, and/or other input parameters or metadata. Alternatively, the traces can be generated using real inputs (e.g., with data values).

A trace preferably represents a series of operations on a set of inputs and/or intermediary variables along a path of the traceable program, but can be otherwise defined. A trace can include a set of intermediary variables, each associated with a set of intermediate expressions (e.g., equations) formed using a set of operators. In variants, the set of intermediary variables can be ordered and form a sequence. Each expression can define one or more variables as a function of applying one or more operators on a set of inputs (input variables) or intermediary variables defined by prior expressions. A trace can include a set of equations (e.g., sequentially defining new intermediate variables based on operators applied to prior input or intermediate variables), include a graph, or be otherwise structured. However, the trace can be otherwise defined.

In variants, the compiler can generate a set of intermediary traces and an execution trace. However, the compiler can generate other traces.

An intermediary trace functions as an intermediary between the program and the execution trace, and is transformed, optimized, and/or otherwise manipulated to generate the execution trace. In variants, the compiler can generate a set of intermediary traces.

In variants, the set of intermediary traces generated by the compiler can include: an initial trace, a primitive trace, and/or other traces.

The initial trace (e.g., first trace, preliminary trace, etc.) can include a set of higher-level operations (e.g., on the inputs, proxy inputs, and/or intermediary variables) that are decomposable into lower-level primitive operations. The initial trace is preferably generated from the program, but can alternatively be generated from another representation of the program. The initial trace is preferably generated by the interpreter, but can be determined by another component. The initial trace is preferably generated by interpreting the program, but can additionally or alternatively be generated by executing the program with proxy inputs (e.g., logging the series of operations during execution), by executing the program with real inputs (e.g., performing computations on accelerator hardware using real inputs, wherein the series of operations are logged during computation), and/or otherwise logging or tracing the series of operations. In examples, an initial trace can be generated by converting (e.g., translating) messages generated during program execution into high-level operations. However, the initial trace can be otherwise generated.

The primitive trace functions as a low-level, atomic representation of the program (e.g., the control flow path). The primitive trace preferably only includes primitive operators, but can alternatively include intermediate operators or other operators. The primitive trace is preferably generated from the initial trace, but can alternatively be generated directly from the program (e.g., generated from program execution, generated from program interpretation, etc.), from another intermediate trace, or from another program representation. Each intermediate operator within the initial trace can be associated with a predetermined set of primitive operators (e.g., series of primitive operators), wherein the primitive trace can be generated from the initial trace by replacing the higher-level operators with the respective set of primitive operators. Alternatively, the primitive trace can be generated by: logging the primitive operations used during program execution, by using a decomposition model (e.g., ML model trained to predict the set of primitive operators for a given higher-level operator or set thereof; a set of rules to decompose the higher-level operator, etc.), by using a set of intermediary operators (e.g., wherein the higher-level operators are decomposed into the intermediate operators, which are then decomposed into the primitive operators), and/or otherwise generated.

In an illustrative example, the machine learning module torch.nn.functional.softmax can generate the following traces, wherein the "ltorch" calls are higher-level operations, the "prims" calls are decompositions of the preceding "ltorch" calls, the txx variables (e.g., t63, t55, etc.) are intermediate variables representing a trace operation, and the cuda values can define the input parameters:

t63=ltorch.softmax(t52, dim=-1) #t63: "cuda: 0 f16 [8, 12, 64, 64]"
t53=prims.convert_element_type (t52, dtypes.float32) #t53: "cuda: 0 f32 [8, 12, 64, 64]"
t55=ltorch.amax (t53,-1, keepdim=True) #t55: "cuda: 0 f32 [8, 12, 64, 1]"
t54=prims.amax (t53, (3,)) #t54: "cuda: 0 f32 [8, 12, 64]"
t55=prims.broadcast_in_dim (t54, [8, 12, 64, 1], [0, 1, 2]) #t55: "cuda: 0 f32 [8, 12, 64, 1]"
t57=ltorch.sub (t53, t55) #t57: "cuda: 0 f32 [8, 12, 64, 64]"
t56=prims.broadcast_in_dim (t55, [8, 12, 64, 64], (0, 1, 2, 3)) #t56: "cuda: 0 f32 [8, 12, 64, 64]"
t57=prims.sub (t53, t56) #t57: "cuda: 0 f32 [8, 12, 64, 64]"
t58=ltorch.exp (t57) #t58: "cuda: 0 f32 [8, 12, 64, 64]"
t58=prims.exp (t57) #t58: "cuda: 0 f32 [8, 12, 64, 64]"
t60=ltorch.sum (t58,-1, keepdim=True) #t60: "cuda: 0 f32 [8, 12, 64, 1]"
t59=prims.sum (t58, (3,)) #t59: "cuda: 0 f32 [8, 12, 64, 64]"
t60=prims.broadcast_in_dim (t59, [8, 12, 64, 1], [0, 1, 2]) #t60: "cuda: 0 f32 [8, 12, 64, 1]"
t62=ltorch.true_divide (t58, t60) #t62: "cuda: 0 f32 [8, 12, 64, 64]"
t61=prims.broadcast_in_dim (t60, [8, 12, 64, 64], (0, 1, 2, 3)) #t61: "cuda: 0 f32 [8, 12, 64, 64]"
t62=prims.div (t58, t61) #t62: "cuda: 0 f32 [8, 12, 64, 64]"
t63=prims.convert_element_type (t62, dtypes.float16) #t63: "cuda: 0 f16 [8, 12, 64, 64]"

However, the compiler can generate other intermediary traces.

The execution trace can be an optimized, transformed trace of the program, more preferably an optimized, transformed trace of a control flow path from the program. In variants, the execution trace can be an optimized program (e.g., set of code) that computed its forward and backward passes, coalesces operations into efficient fusion regions, dispatches computations to optimized kernels (e.g., optimized for that computation), distributes computations optimally across machines, and/or performs other functions. The execution trace is preferably executed in lieu of the program during runtime, but can additionally or alternatively be used for analyses (e.g., anomaly tracing, fault analysis, debugging, etc.) or be otherwise used. The execution trace preferably computes the same results as the program (e.g., up to numerical accuracy, numerical precision, etc.), but can alternatively compute different results (e.g., deviate by less than a threshold amount, by more than a threshold amount, etc.). The execution trace preferably computes the same results with better performance than the program (e.g., faster, lower latency, less memory, etc.), but can alternatively compute the same results with similar or worse performance.

The execution trace is preferably a transformed and/or optimized version of the primitive trace, but can alternatively be a transformed and/or optimized version of the initial trace or other intermediary trace. In a first variant, the execution trace is generated by optimizing and/or transforming a primitive trace. In a second variant, the execution trace is generated by optimizing and/or transforming the initial trace, then decomposing operations that are not executor fusions into primitive operations. However, the execution trace can be generated from any other suitable trace.

Examples of transformations and/or optimizations that can be applied to generate the execution trace can include: grad, fusions, distributed (e.g., DDP, FSDP), functional transformations (e.g., vmap, vjp, jvp), dead code elimination, delete last used variables, executor fusion replacements, and/or other transformations and/or optimizations. Executor fusion replacements can replace a set of operations (e.g., a series of primitive operations, set of contiguous operations, chunk of operations, etc.) of a trace with an executor fusion (e.g., call by an executor to a device kernel). For example, the executor fusion nvFusiono can be used to replace an add ( ) and mul ( ) primitive operation set. The operation set (e.g., operation chunk) replaced by an executor fusion can be: predetermined, predicted (e.g., by an optimization model trained to predict which operation set can be replaced by an executor fusion), manually determined, and/or otherwise determined. In variants, each executor can be associated with a set of executor fusions, which, in turn, are associated with a predetermined set of operations (e.g., series of operations, series of primitive operations, etc.). When the compiler uses executors with overlapping executor fusions (e.g., executor fusions that are associated with the same set of operations), the compiler can select an executor fusion to use as the operation set replacement. The executor fusion can be selected based on: the performance of the respective device kernel (e.g., memory consumption, processing speed, compute consumption, etc.); whether the respective executor has reserved or claimed the operation set; the executor or executor fusion priority (e.g., wherein higher priority executor fusion are selected over lower priority executor fusion), and/or otherwise selected. In examples, an execution trace can include executor fusions from multiple executors (e.g., wherein the most performant executor fusion is selected for each operation set that could be replaced); alternatively, an execution trace can include executor fusions from a single executor.

In an illustrative example, an intermediate trace can be transformed into the execution trace by: obtaining a grad of the intermediate trace, inserting cast operations for running at lower precision, inserting distributed calls (e.g., DDP, FSDP, PP, TP, etc.), applying code consolidation transformations (e.g., removing dead code, deleting unused variables, etc.), and fusing operations within the intermediate trace (e.g., based on operations that have been claimed by different executors). However, the execution trace can be otherwise generated.

However, the compiler can generate any other suitable set of traces.

The compiler can also generate a compilation context that functions to provide additional context for each trace. For example, the compilation context can be used to acquire and inspect executor fusions. The compilation context is preferably also in a programming language, more preferably the program's formal language (e.g., also in Python, PyTorch, etc.), but can alternatively be implemented in another language. The compilation context can include: executor fusions, the device kernel mapped to a given executor fusion (e.g., the specific calls that the executor fusion "nvFusion0" maps to), the input parameters, resource management instructions (e.g., file handling, network connections, database connections, etc.) and/or other information. The compilation context can be: shared by all traces, shared by the intermediate traces, specific to the primitive trace, specific to the initial trace, specific to the execution trace, and/or associated with any other suitable set of traces.

The compiler can be used with one or more computing devices (e.g., devices), which can be used to execute the program and/or associated trace(s). The device is preferably a hardware accelerator, but can alternatively be another device. A hardware accelerator is preferably a hardware device designed to accelerate AI and ML applications. The devices (e.g., hardware accelerators) can include manycore designs (e.g., parallel cores, serial cores, etc.), but can alternatively have a single core. The devices (e.g., hardware accelerators) preferably focus on low-precision arithmetic, but can alternatively compute high-precision arithmetic. Examples of devices (e.g., hardware accelerators) that can be used include: GPUs, TPUs, IPUs, CPUs, NPUs, and/or other processing units. Each device can be associated with one or more executors. Each executor is preferably associated with a single device, but can alternatively be associated with (e.g., include executor fusions for) multiple devices. An executor can be specific to: a device type (e.g., GPU, CPU, etc.), device manufacturer (e.g., Nvidia, AMD, etc.), device make or model, and/or otherwise specific or generic. Each device can be associated with one or more executors, wherein the executors include device kernels for said device. In variants, the program and/or traces can be executed on one or more devices (e.g., in parallel, using distributed computing). The devices can be provided by the entity providing the compiler, by the user, by a cloud system, and/or by any other suitable entity.

The compiler can be executed on a computing system. The computing system can be separate from the devices (e.g., hardware accelerators), or include the devices. The computing system can include: a remote computing system, a local computing system (e.g., a user device such as a smartphone, a laptop, a desktop, a tablet, etc.), a distributed system, a centralized system, and/or any other suitable computing system.

However, the compiler can be otherwise configured, and/or be used with any other suitable set of objects.

4. Method.

In variants, the method can include: receiving a program S100; determining a set of proxy inputs for the program S200; generating a set of intermediate traces for the program S300; and generating a set of execution traces for the program S400. The method can optionally include: storing the set of execution traces; executing an execution trace from the set S500; and/or other processes. The method functions to generate higher performance versions of the program. In examples, the method can make program execution faster by simplifying the program (e.g., by using primitive traces), by optimizing the program (e.g., to remove dead code, etc.), by using hardware executors (e.g., by using calls to device kernels specialized for the computing device), and/or otherwise optimizing the program.

The method is preferably performed by the compiler described above, but can alternatively be performed by another compiler, interpreter, and/or other system. All or portions of the method can be performed by one or more components of the system, using a computing system, using a database (e.g., a system database, a third-party database, etc.), by a user, and/or by any other suitable system.

All or portions of the method can be performed in real time (e.g., responsive to a request), iteratively, concurrently, asynchronously, periodically, and/or at any other suitable time. All or portions of the method functionalities can be performed automatically, manually, semi-automatically, and/or otherwise performed.

In a first variation, the method can be performed when a predetermined compiler call is executed. For example, the method can be performed when thunder.jit ( ) is called on a program (e.g., set of modules or functions).

In a second variation, the method can be performed before a program is deployed for distributed training or inference.

In a third variation, the method can be performed when the cost (e.g., monetary cost, computational cost, etc.) of running the program exceeds a threshold value.

However, the method can be performed at any other suitable time.

The method is preferably performed for each control flow path within the program, but can alternatively be performed for a subset of the control flow paths, a set of control flow paths selected by the user, and/or any other suitable set of control flow paths. The method can be performed for multiple control flow paths: serially, in parallel, and/or with any other temporal relationship. The order or subset of the control flow paths that the method is performed on can be determined based on: the input data (e.g., by sampling the input parameter permutations and/or distribution from a set of program inputs), a ruleset (e.g., exhaustively explore each control flow path according to a set of rules), the probability that the control flow path will be used, and/or otherwise determined.

The entire program is preferably analyzed at the same time; alternatively, frames of the program can be analyzed (e.g., asynchronously).

All or portions of the method are preferably performed statically, without execution of the program or computing data values, but can alternatively be performed dynamically (e.g., during program execution, during program computation, etc.).

Receiving a program S100 functions to determine the program to be compiled and/or optimized. The program is preferably received from a user, but can alternatively be received from a third party database (e.g., Github, etc.) or any other suitable database. In an illustrative example, receiving a program includes receiving a compiler call identifying the program or function object (e.g., thunder.jit (program)), wherein the compiler retrieves the identified program. However, the program can be otherwise received.

Determining a set of proxy inputs for the program S200 functions to generate representations of the program inputs. In variants, the set of proxy inputs lack actual data values, but can include other properties and/or metadata (e.g., parameters) of the inputs, fake data values, and/or other information. This can enable the system to trace the program without performing any computations (e.g., using the program, using the trace, etc.). Alternatively, real inputs can be used (e.g., without determining proxy inputs). In a first variant, S200 can include: determining the set of program inputs, determining the input parameter sets for each of the program inputs, and generating proxy inputs sharing input parameter sets with the program inputs. The set of program inputs can be determined: based on the program variable definitions, based on the control flow decision points (e.g., wherein the set of program inputs include input parameter sets for each decision option), based on the actual program data, randomly, and/or otherwise determined. A different proxy input can be generated for each program input; alternatively, a different proxy input can be generated for each unique set of input parameters, multiple proxy inputs can be generated for each program input, and/or any other suitable number of proxy inputs can be generated. In a second variant, S200 can include: generating different permutations of input parameter sets (e.g., for each program input), wherein different traces are generated for each permutation (e.g., in S300, S400, etc.). The input parameter values in the permutations can be selected: randomly, from a distribution (e.g., the distribution of input parameters from real inputs), and/or otherwise determined. However, the proxy inputs can be otherwise determined.

Generating a set of intermediate traces for the program S300 functions to generate a trace that can be manipulated, transformed, and/or optimized. The set of intermediate traces preferably include a trace for each control flow path within the program, but can alternatively include trace for a subset of the control flow paths within the program. The set of intermediate traces preferably include an initial trace and a primitive trace for each control flow path, but can alternatively include only an initial trace, only a primitive trace, and/or include any other suitable number of traces.

The set of traces is preferably generated by proxy tracing using the set of proxy inputs, but can alternatively be generated using a set of real inputs (e.g., with data values), and/or generated using any other input variable. Each trace can be generated using one proxy input (e.g., for a single input program or control flow path), multiple proxy inputs (e.g., for multi-input programs or control flow paths), and/or any number of proxy inputs. The program can be traced one or more times using different sets of proxy inputs (e.g., with different properties or parameters).

In variants, S300 can generate a different intermediate trace set for each control flow path within the program, generate a different intermediate trace set for each proxy input, generate a different intermediate trace set for each unique proxy input-control flow path combination, and/or generate any other number of intermediate trace sets.

The intermediate traces can be stored in association with the proxy inputs and/or input parameter set used to generate the respective trace, with a control flow path identifier, with a real input identifier, and/or with any other suitable information.

The intermediate traces are preferably determined based on the program bytecode, more preferably decompiled bytecode, but can alternatively be performed on a disassembled version of the program, an assembled version of the program or on any other suitable form of the program.

In a first variant, S300 includes: determining an initial trace; and determining a primitive trace based on the initial trace and a set of primitive operators.

In the first variant, the initial trace can be determined by an interpreter; be determined using denotational semantics, axiomatic semantics, operational semantics, abstract interpretation, data-flow analysis, Hoare logic, model checking, symbolic execution, and/or any other suitable analysis method; and/or otherwise determined. In a specific example, the initial trace is determined by logging messages output during program execution (e.g., with proxy inputs, with real inputs, etc.), then converting the messages to intermediate operations. However, the initial trace can be otherwise determined.

Figure 10:
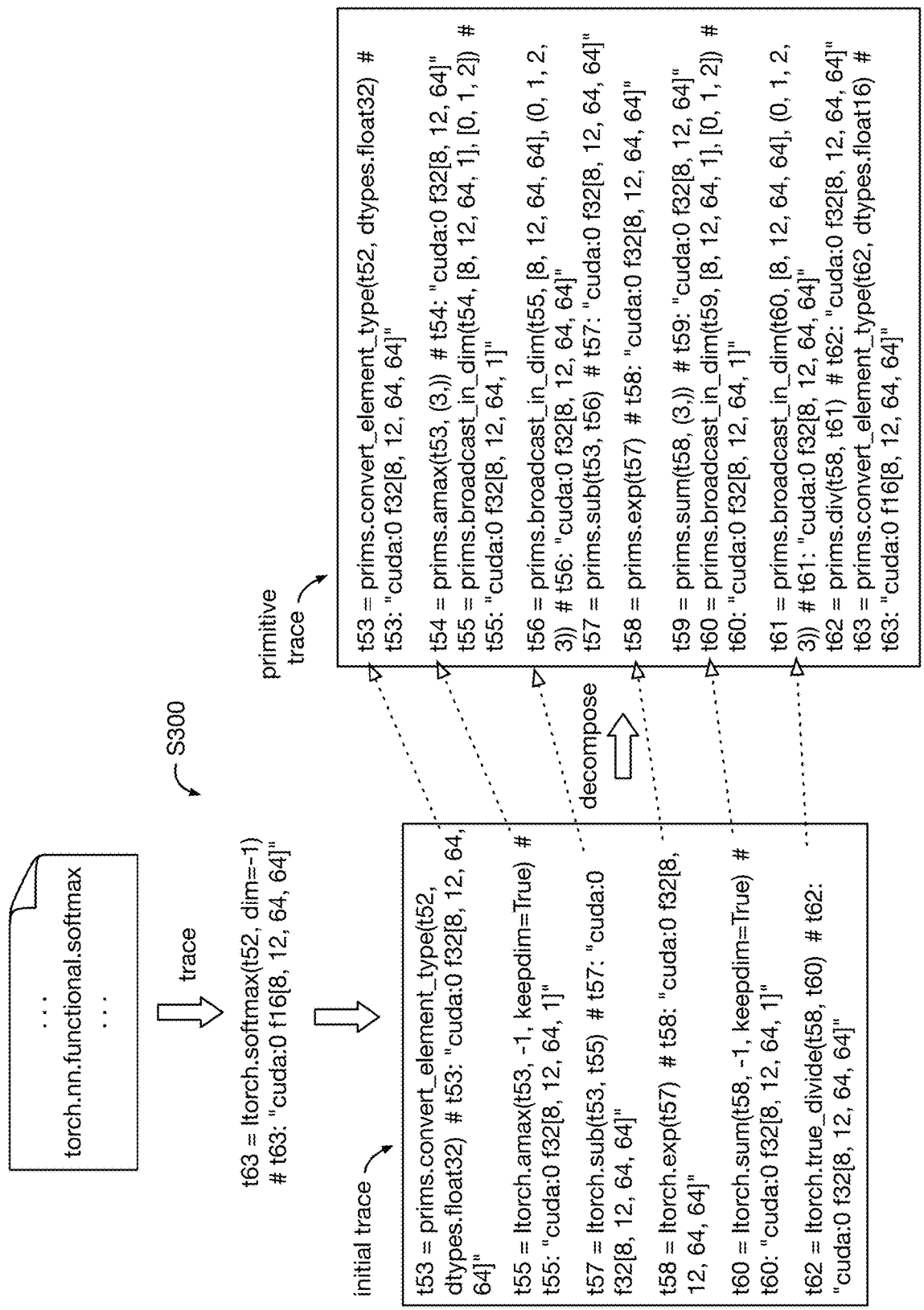
FIG. 10 is an illustrative example of decomposing an initial trace into a primitive trace.
Figure 11A:
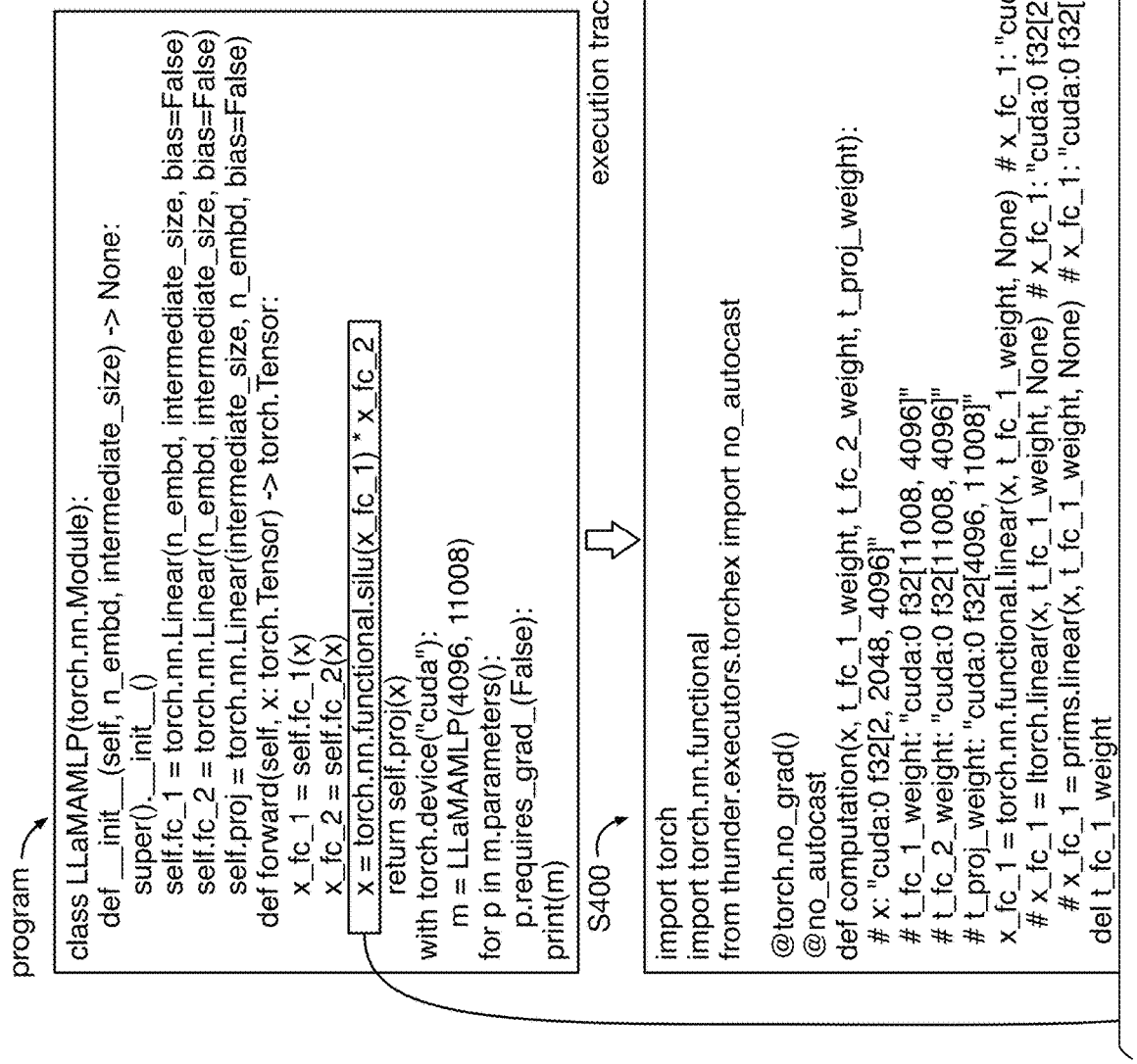
FIG. 11 is an illustrative example of generating a set of initial traces (e.g., "ltorch" calls) from a program, generating a set of primitive traces (e.g., "prims" calls), and optimizing the traces with an executor fusion.

In the first variant, the primitive trace can be determined by decomposing each intermediate operator in the initial trace using a set of primitive operators (e.g., using a decomposition module), or otherwise determined. Examples are shown in FIG. 10 and FIG. 11. The intermediate operator can be replaced with a known set of primitive operators (e.g., wherein each intermediate operator is associated with a predetermined set of primitive operators); replaced with a set of predicted primitive operators (e.g., predicted using a trained decomposition model); and/or replaced with a set of primitive operators that are otherwise determined.

In a second variant, S300 includes: executing the program using a set of inputs (e.g., proxy inputs, actual inputs, etc.) and recording the set of operators used during program execution.

In a third variant, S300 includes using proxy tracing to generate a set of operational graphs (e.g., one or more operational graphs per proxy input set) from the program, wherein each operational graph can include a set of logical branches. Each logical branch can include a set of operations (e.g., a series of operations). The operations are preferably primitive operations, but can alternatively be intermediate operations or other operations. Logical branches can be associated with different conditionals and/or otherwise differ. Each logical branch is preferably a linear branch, but can alternatively be a nonlinear branch (e.g., refer to an earlier node, refer to other branches, etc.). In variants, nonlinear logical branches can be identified and made linear (e.g., by splitting the nonlinear branches into constituent linear branches, by replicating the linear branch multiple times, etc.), a user can be notified that the branch cannot be optimized, the branch can be marked as a branch that requires dynamic compilation during execution, and/or otherwise handled.

In specific examples, generating the sequential trace can include: disassembling a module (e.g., machine learning model) or function into bytecode, interpreting the bytecode using an interpreter, generating a sequential trace of higher-order operations on tensors and numbers, and decomposing the higher-order operations into primitive operations to generate the sequential trace of primitive operations.

However, S300 can be otherwise performed.

Generating a set of execution traces for the program S400 functions to generate an optimized version of the program. S400 can be performed by the compiler, by a module of the compiler (e.g., optimization module, etc.), or by any other suitable component. In variants, S400 can generate a different execution trace for each control flow path within the program, generate a different execution trace for each proxy input, generate a different execution trace for each unique proxy input-control flow path combination, and/or generate any other number of execution traces. The set of execution traces is preferably generated from the set of intermediate traces, more preferably the primitive traces but alternatively the initial traces, but can alternatively be generated directly from the program bytecode or from any other suitable precursor. One execution trace is preferably generated for each set of intermediate traces (e.g., initial trace, primitive trace pair; set of related traces; etc.), but multiple execution traces can alternatively be generated for a set of intermediate traces, a single execution trace can be generated for multiple sets of intermediate traces, and/or any other number of execution traces can be generated for any number of intermediate trace sets.

In variants, S400 can include: optimizing the intermediate trace, transforming the intermediate trace, determining executor fusions for subsets of the intermediate trace, and/or otherwise manipulating an intermediate trace to generate the execution trace. The processes can be performed in any order or in a predetermined order (e.g., intermediate trace optimization, then intermediate trace transformation, then executor fusion).

Optimizing the intermediate trace can include: dead-code elimination, stack height reduction, reordering computations, code factoring, dead-store elimination, common subexpression elimination, constant folding and propagation, induction variable recognition and elimination, and/or other optimizations (e.g., code generator optimizations, data flow optimizations, functional language optimizations, interprocedural optimizations, etc.).

Figure 4:
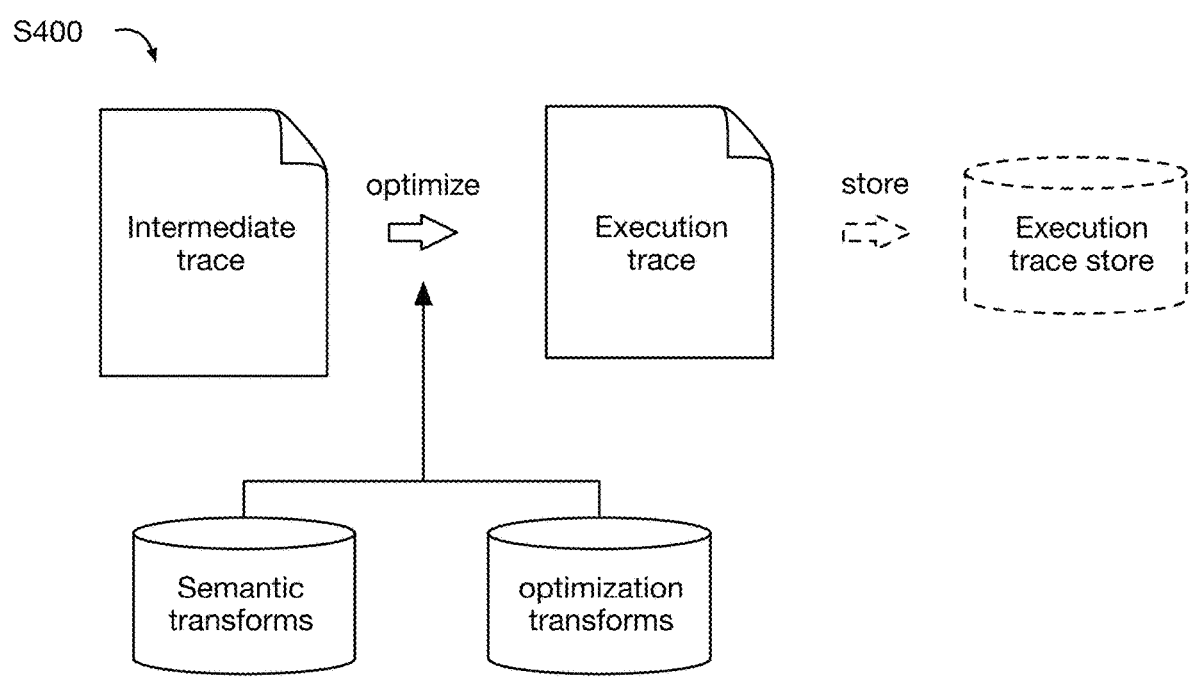
FIG. 4 is an illustrative example of the relationship between an intermediate trace and an execution trace.

Transforming the intermediate trace can add additional functionalities (e.g., operations), remove unnecessary functionalities, and/or otherwise transform the trace. In an example, transforming the intermediate trace can include: obtaining a grad (or nested grads) of the trace, applying backward to the trace, applying autograd to the trace, inserting cast operations for running at lower precision, applying any custom transformations, inserting distributed computing calls (e.g., DDP, FSDP, PP, TP, etc.), applying a primitive operator's transformation rule for a given transformation to the primitive operation (e.g., wherein the program specified the transformation for a corresponding chunk of program code), applying optimizing transforms (e.g., an original operation is replaced with a more efficient version of the same operation, while the semantics are preserved, etc.), applying semantic transforms (e.g., wherein the original operation is replaced with a different operation; example shown in FIG. 4), and/or otherwise transforming the intermediate trace. An example of a semantic operation can include replacing a set of operations that collectively compute the grad ( ) of a loss with respect to an input with a call to an executor-native program. An example of an optimizing transform can include removing extraneous intermediate assignments or otherwise optimizing the operations. The operations can be transformed using: lookup tables, rules, heuristics, pattern matching, and/or otherwise transformed.

In specific examples, transforming the trace can include: obtaining a grad of the trace, optionally inserting cast operations for running at lower precision, optionally applying custom transformations to the trace, and optionally inserting distributed computing calls (e.g., DDP, FSDP, PP, TP, etc.) into the trace. In variants, each primitive operation includes its own transformation rule for each machine learning program transformation, wherein transforming the trace includes applying the respective transformation rule for the respective machine learning program transformation.

Determining executor fusions for subsets of the intermediate trace functions to fuse trace operators using executor fusions from one or more different executors. This replaces chunks of trace operations with calls to the executors' device kernels, which are specifically written for the device (e.g., hardware accelerator) performing the computations and therefore far more performant than the program or the trace operations. In a first variant, the resultant execution trace can include executor fusions from multiple executors. In a second variant, the resultant execution trace can include executor fusions from a single executor. In a third variant, the resultant execution trace can lack executor fusions. However, the resultant execution trace can be otherwise configured.

In variants, determining executor fusions for subsets of the intermediate trace can include: searching through the intermediate trace for each of a set of predetermined operation sequences (e.g., predetermined primitive operator sequences; the intermediate trace subset; etc.), and replacing the predetermined operation sequence with an executor fusion.

Figure 9:
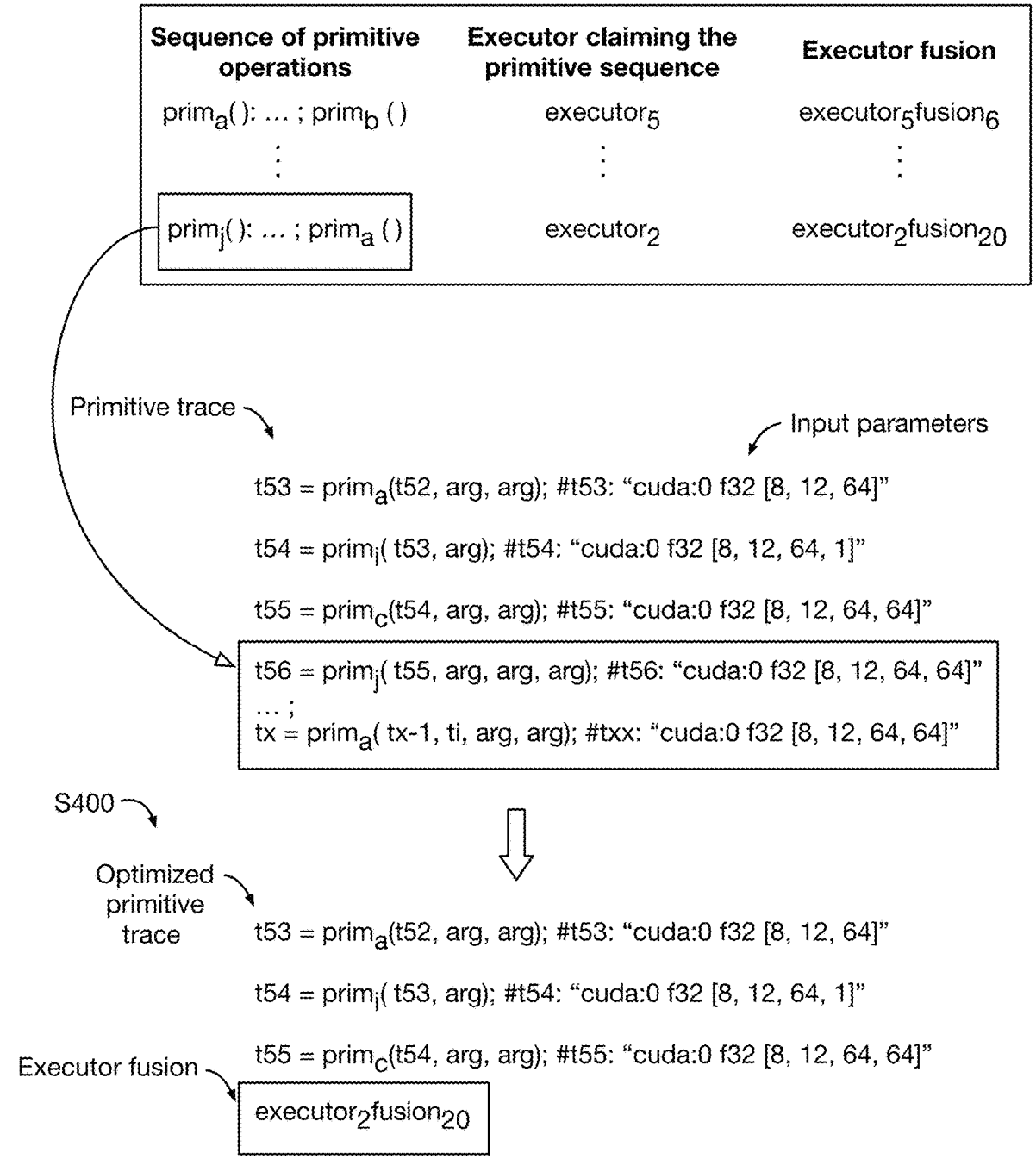
FIG. 9 is an illustrative example of optimizing traces using executor fusions.

In a first variant, the executor fusion used to replace the predetermined operation sequence can be an executor fusion from an executor that claimed the predetermined operation sequence (e.g., example shown in FIG. 9). For example, if nvFuser (e.g., an executor) claimed an add ( ), mul ( ) primitive operator sequence, then the nvFuser executor fusion associated with the add ( ), mul ( ) primitive operator sequence is used to replace the add ( ), mul ( ) primitive operator sequence within the trace, while the cuDNN executor fusion for the add ( ), mul ( ) primitive operator sequence is not used to replace the add ( ), mul ( ) primitive operator sequence within the trace.

In a second variant, the executor fusion used to replace the predetermined operation sequence can be selected based on the priority of the executor or the executor fusion. In a first embodiment, executor fusions from higher-priority executors are preferentially used to replace the predetermined operation sequence. For example, if nvFuser is higher priority than cuDNN, then the nvFuser executor fusion is used instead of the cuDNN executor fusion. In a second embodiment, executor fusions from different executors for the same predetermined operation sequence can be prioritized based on performance (e.g., computation speed, compute consumption, memory consumption, etc.), cost, efficiency (e.g., most computationally efficient, most memory efficient, most cost efficient, most power efficient, etc.), or another metric. For example, if the cuDNN executor fusion is more performant for the add ( ) mul ( ) operation sequence than the nvFuser executor fusion, then the cuDNN executor fusion can be selected for replacement. The best executor can be determined using: a lookup table (e.g., mapping each operation type to an executor type; recording the operation's efficiency for each executor type; etc.), empirically determined by running the operation (or a similar operation) through each executor type and monitoring the performance, and/or otherwise determined.

In a third variant, the executor fusions used to replace the predetermined operation sequence can be limited to those offered by a predetermined subset of executors (e.g., a single executor, a manually selected set of executors, etc.). This variant can be used when the set of hardware accelerators that will be used to execute the execution traces is limited (e.g., only nvFuser executor fusions are used when only Nvidia GPUs will be used for computation), when the user specifies the set of executors to use, and/or used at any other time.

In a fourth variant, the executor fusions used to replace the predetermined operation sequence can be randomly selected from the set of executor fusions that are available for the predetermined operation sequence.

In a fifth variant, a set of candidate execution traces can be generated, wherein each candidate execution trace includes a different permutation of executor fusions for each predetermined operation sequence within the trace. The set of candidate execution traces can then be evaluated (e.g., executed, etc.), wherein the most performant candidate execution trace can be selected.

However, the executor fusions used to replace the predetermined operation sequence can be otherwise determined.

However, the execution trace can be otherwise determined.

The method can optionally include storing the set of execution traces, which functions to save the execution traces for future use. The execution traces are preferably persistently stored, but can alternatively be temporarily cached or otherwise stored. The execution traces can be stored locally, remotely, with the original program, or otherwise managed. Each program can be stored in association with a plurality of execution traces, or with a single execution trace. Each execution trace can be stored in association with: an identifier for the control flow path that the execution trace was generated from; the input parameters used to generate the execution trace (e.g., the input parameters for the input variables or proxy inputs in the execution trace); a set of executor identifiers (e.g., for the executors supplying the executor fusions within the execution trace); a set of device identifiers (e.g., devices associated with the executor fusions within the execution trace); and/or other information.

Executing an execution trace S500 functions to compute the same set of results as the program (e.g., up to numerical accuracy), but using code that is better optimized for the hardware performing the computations (e.g., executing the computations more efficiently, faster, and/or with otherwise better performance than dynamic execution of the program). S500 is preferably performed in response to a program execution request or call (e.g., wherein an execution trace from the execution trace set associated with the program can be selected and executed; example shown in FIG. 5); performed in response to an execution trace execution request or call; performed when the respective control flow path from the program is executed or called; and/or performed when any other suitable condition is met. S500 can be performed one or more times. For example, S500 can be repeated for different program execution calls, repeated for a single program execution call (e.g., wherein the control flow for the program would have iterated over the same control flow path multiple times), or repeated any number of times. Different instances of S500 can be concurrently performed (e.g., by parallel compute, parallel cores, distributed computing systems, etc.), serially performed, and/or performed with any other temporal relationship.

S500 can include: executing the execution trace operations (e.g., compiling each execution trace operator or set thereof to machine instructions and executing the machine instructions); calling the executor associated with an executor fusion (e.g., via a local call, via an API, etc.); calling the device kernel associated with the executor fusion; and/or otherwise executing the execution trace.

S500 is preferably executed by one or more devices (e.g., hardware accelerators), but can alternatively be performed by the computing system generating the execution traces, and/or by any other set of computing systems. The devices used to execute S500 are preferably devices associated with the executor fusions and/or executors used in the execution trace, but can alternatively be other devices. For example, when the execution trace includes nvFuser fusions (e.g., calls) and Intel NPU Accelerator library fusions (e.g., calls), different parts of the execution trace can be executed on GPUs (e.g., the nvFuser fusions) and NPUs (e.g., the NPU Accelerator library fusions), respectively. However, the execution trace can be executed on a single device, device type, or other set of devices.

In variants, executing the execution trace can include: determining actual program inputs; selecting an execution trace; and executing the selected execution trace using the actual program inputs. However, the execution trace can be otherwise executed.

Determining actual program inputs (e.g., live inputs) functions to obtain the input data for result computation, and can also provide the information needed for execution trace selection. The actual program inputs preferably include data values in addition to input parameters (e.g., includes values in the tensor indices, in addition to a tensor shape, size, dtype, and grad requirement); however, the actual program inputs can be otherwise configured. The actual program inputs can be: tensors (e.g., matrices), numbers, text, audio, video, signals, and/or be any other data object. The actual program inputs can be: received, retrieved, computed, or otherwise determined. The actual program inputs can be: received from a user or request (e.g., request calling the program); received from a prior iteration of S500 (e.g., be a result computed using an execution trace of the set associated with the program; be a result retrieved from a shared log, buffer, or other memory space; etc.); from an auxiliary program; from an external system (e.g., received from an API, data stream, server response, etc.); from a database (e.g., of program inputs, model inputs, training inputs, test inputs, etc.); and/or from any other data source. The actual program inputs are preferably determined once for each iteration of S500, but can alternatively be determined multiple times. One or more actual program inputs can be determined for a given S500 iteration (e.g., for a given execution trace). However, the actual program inputs can be otherwise determined.

Selecting an execution trace functions to determine which execution trace to use for result computation. The execution trace is preferably selected from the set of execution traces associated with (e.g., generated from) the program (e.g., the called program), but can alternatively be selected from a set of predetermined execution traces that are unassociated with the program, or be selected from any other suitable execution trace set. A single execution trace is preferably selected for each S500 iteration; alternatively, multiple execution traces can be selected (e.g., a series of execution traces). In a first variation, selecting an execution trace can include: determining a control flow path, and selecting the execution trace for the control flow path (e.g., example shown in FIG. 5). The control flow path can be determined based on the actual program input values, the actual program input metadata (e.g., size, shape, dtype, etc.), and/or other information. In a second variation, selecting an execution trace can include: determining the input parameter sets for each of the actual program inputs, and selecting the execution trace associated with the set of input parameter sets (e.g., example shown in FIG. 5). For example, when a first actual program input is an integer and a second actual program input is a 4×2 tensor, an execution trace associated with an integer and a 4×2 tensor can be selected. In a third variation, the execution trace can be manually selected. However, the execution trace can be otherwise selected.

Executing the selected execution trace using the actual program inputs functions to compute the program result (e.g., up to numerical accuracy, etc.). The selected execution trace can be executed by: an interpreter, a compiler (e.g., JIT compiler), a computing environment, and/or by any other suitable computer program. The computer program used to execute the execution trace is preferably the same as that called to execute the program (e.g., a Python interpreter, a Python compiler, etc.), but can alternatively be a different computer program (e.g., configured to execute programs in the execution trace's programming language). The execution trace is preferably executed on one or more devices (e.g., hardware accelerators, processing hardware, etc.; example shown in FIG. 5), but can additionally or alternatively be executed on any other suitable computing system. One or more instances of the execution trace can be concurrently executed (e.g., for different actual program inputs, when distributed computing is requested, to determine a probabilistic output, etc.) and/or in other computing contexts.

Figure 5:
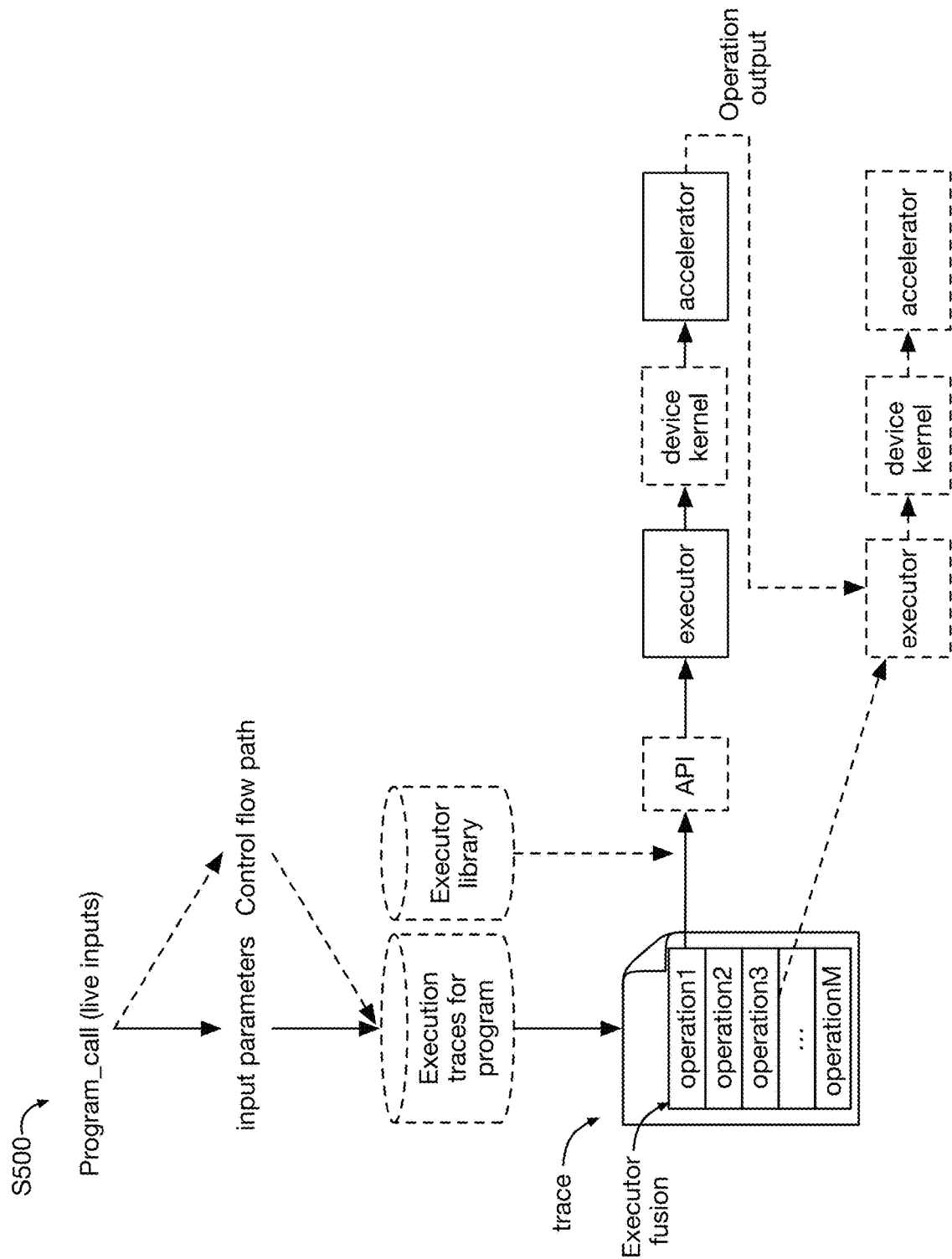
FIG. 5 an illustrative example of executing a program using the executors, device kernels, and/or accelerators (e.g., computing hardware).

In variants, executing the selected execution trace can include: executing the operations (e.g., primitive operations) from the execution trace on a primary device (e.g., performing execution trace computations on the accelerator) using the actual program inputs; and assigning or distributing the executor fusion operations to devices associated with the respective executor fusion (e.g., secondary devices), wherein the device kernel associated with the executor fusion is called and executed on the secondary device (e.g., example shown in FIG. 5). In variants, when the executor fusion is for an executor for the primary device, the primary device can execute the executor fusion operation. In an example, when the execution trace includes executor fusions for GPU executors and NPU executors, and the primary device is a CPU, the primitive operations of the execution trace can be computed on the CPU, the GPU fusions can be distributed to a set of GPUs (and/or GPU device kernels) for computation, and the NPU fusions can be distributed to a set of NPUs (and/or NPU device kernels) for computation. In variants, the primary device can: wait until the secondary device completes device kernel execution and returns a response; coordinate information transfer between the secondary devices (e.g., specify which information to retrieve from shared operation output storage, specify where to send a device kernel output, etc.); continue execution without delay; and/or otherwise coordinate or manage execution trace execution. However, the entire execution trace can be executed on the primary device, or otherwise executed.

In variants, when the set of input properties are associated with an intermediate representation that could not be optimized (e.g., associated with an intermediate representation with a nonlinear logical branch), the program can be dynamically executed using the live inputs.

However, the execution trace can be otherwise executed.

However, the method can be otherwise performed.

A numbered list of specific examples of the technology described herein are provided below. A person of skill in the art will recognize that the scope of the technology is not limited to and/or by these specific examples.

Specific example 1. A processing system comprising a compiler, configured to: receive a code set; determine a set of proxy inputs for the code set, wherein each proxy input lacks a data value and shares input parameters with an input from the code set; generate an intermediary trace for the code set using the set of proxy inputs, wherein the preliminary trace comprises a sequence of primitive operations; and generate an execution trace by optimizing the preliminary trace, wherein optimizing the preliminary trace comprises replacing subsets of primitive operations from the intermediary trace with executor fusions associated with device kernels, wherein the execution trace is executed instead of the code set during runtime.

Specific example 2. The compiler of specific example 1, wherein the code is in Python and the execution trace is in Python.

Specific example 3. The compiler of specific example 2, wherein the intermediary trace is in Python.

Specific example 4. The compiler of specific example 1, wherein the compiler is configured to generate a plurality of execution traces, wherein each execution trace is specific to a different control flow of the code set.

Specific example 5. The compiler of specific example 1, wherein the intermediary trace is generated without performing computations based on the code set.

Specific example 6. The compiler of specific example 1, wherein each primitive operation is associated with a transformation rule for each of a set of machine learning program transformations, wherein the compiler is further configured to transform a subset of primitive operations based on the respective transformation rules associated with a machine learning program transformation identified in the code set.

Specific example 7. The compiler of specific example 6, wherein the set of machine learning program transformations comprise grad, backward, or autograd.

Specific example 8. The compiler of specific example 1, further configured to select an executor for each subset of primitive operations from a plurality of executors, wherein the executor fusion is associated with the selected executor.

Specific example 9. The compiler of specific example 1, wherein the sequence of primitive operations comprise a broadcast operation.

Specific example 10. The compiler of specific example 1, wherein each device kernel is configured to run on a specific hardware accelerator, wherein the hardware accelerator can comprise at least one of: a GPU, CPU, TPU, IPU, or NPU.

Specific example 11. A method comprising: determining a set of proxy inputs sharing input parameters with a set of inputs from a code set; generating a preliminary trace from the plurality of program instructions using the set of proxy inputs, the preliminary trace comprising a set of sequential operations on the set of proxy inputs; decomposing each operation within the set of sequential operations into a set of primitives; generating an execution trace, comprising replacing subsets of primitives from the decomposed operations with executor fusions associated with a device kernel; and storing the execution trace in association with the set of input parameters, wherein execution traces are retrieved based on the set of input parameters and executed in response to a call to execute the code set.

Specific example 12. The method of specific example 11, further comprising: determining a set of control flows from the code set; wherein a different set of proxy inputs, a different preliminary trace, and a different execution trace is generated for each of the set of control flows.

Specific example 13. The method of specific example 11, wherein generating the execution trace further comprises selecting an executor for each subset of primitives from a plurality of executors, wherein the executor function and the device kernel are associated with the selected executor.

Specific example 14. The method of specific example 11, wherein the code set and the execution trace comprise the same formal language.

Specific example 15. The method of specific example 11, wherein generating the preliminary trace is performed without computation on a hardware accelerator.

Specific example 16. The method of specific example 15, wherein each proxy input lacks data values.

Specific example 17. The method of specific example 15, wherein the input parameters comprise at least one of shape, device, dtype, or whether the proxy requires grad.

Specific example 18. The method of specific example 11, wherein the device kernel comprises a CUDA kernel.

Specific example 19. The method of specific example 11, wherein the set of sequential operations comprise tensor operations.

Specific example 20. The method of specific example 11, wherein each primitive is associated with a transformation rule for each of a set of machine learning program transformations, wherein generating the execution trace further comprises transforming primitives from the decomposed operations based on the respective transformation rules associated with machine learning program transformations within the code set.

Specific example 21. The compiler of specific example 1 or the method of specific example 11, wherein the preliminary trace for a control flow is generated from a subset of the plurality of program instructions that are associated with the control flow.

Specific example 22. The technology of specific example 21, wherein the control flow comprises at least one of a machine learning module or a function.

Specific example 23. The technology of specific example 22, wherein the machine learning module comprises softmax.

Specific example 24. The technology of specific example 1 or specific example 11, wherein the execution trace is generated without using frame objects and/or an XLA compiler.

Specific example 25. The technology of specific example 1 or specific example 11, wherein the preliminary trace and the execution trace share a common compilation context.

Specific example 26. The technology of specific example 25, wherein the compilation context is a Python context.

Specific example 27. The technology of specific example 25, wherein mappings between the executor fusion and the device kernel are stored in the compilation context.

Specific example 28. The technology of specific example 1 or specific example 11, wherein the code set (e.g., a plurality of program instructions) are in Python.

Specific example 29. The technology of specific example 1 or specific example 11, wherein the preliminary trace is generated using a set of proxies for the set of inputs.

Specific example 30. The technology of specific example 1 or specific example 11, wherein the hardware accelerator is associated with the device kernel.

Specific example 31. The technology of specific example 1 or specific example 11, wherein the device kernel is for a hardware accelerator, wherein the hardware accelerator comprises at least one of: a GPU, a TPU, an IPU, a CPU, or an NPU.

Specific example 32. The technology of specific example 1 or specific example 11, wherein the set of inputs comprise tensors or numbers.

Specific example 33. The technology of specific example 1 or specific example 11, wherein the execution trace is generated using an interpreter.

Specific example 34. The technology of specific example 1 or specific example 11, wherein the set of machine learning program transformations comprise autograd.

All references cited herein are incorporated by reference in their entirety, except to the extent that the incorporated material is inconsistent with the express disclosure herein, in which case the language in this disclosure controls.

Optional elements in the figures are indicated in broken lines.

Different processes and/or elements discussed above can be defined, performed, and/or controlled by the same or different entities. In the latter variants, different subsystems can communicate via: APIs (e.g., using API requests and responses, API keys, etc.), requests, and/or other communication channels. Communications between systems can be encrypted (e.g., using symmetric or asymmetric keys), signed, and/or otherwise authenticated or authorized.

Alternative embodiments implement the above methods and/or processing modules in non-transitory computer-readable media, storing computer-readable instructions that, when executed by a processing system, cause the processing system to perform the method(s) discussed herein. The instructions can be manually defined, be custom instructions, be standardized instructions, and/or be otherwise defined. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various elements (and/or variants thereof) discussed above, and/or omit one or more of the discussed elements, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the embodiments of the invention without departing from the scope of this invention defined in the following claims.

We claim:

1. A processing system operably coupled to a non-transitory computer-readable medium storing instructions, comprising a compiler configured to:
   receive a code set configured to receive a set of inputs with data values;
   determine a set of proxy inputs for the set of inputs of the code set, wherein each proxy input lacks a data value and shares input parameters with an input of the set of inputs;
   generate an intermediary trace for the code set using the set of proxy inputs, wherein the intermediary trace comprises a sequence of primitive operations; and
   generate an execution trace by optimizing the intermediary trace, wherein optimizing the intermediary trace comprises replacing subsets of primitive operations from the intermediary trace with executor fusions associated with device kernels in the execution trace, wherein the execution trace is executed instead of the code set during runtime.

2. The processing system of claim 1, wherein the code is in Python and the execution trace is in Python.

3. The processing system of claim 2, wherein the intermediary trace is in Python.

4. The processing system of claim 1, wherein the compiler is further configured to generate a plurality of execution traces, wherein each execution trace is specific to a different control flow of the code set.

5. The processing system of claim 1, wherein the intermediary trace is generated without performing computations based on the code set.

6. The processing system of claim 1, wherein each primitive operation is associated with a transformation rule for each of a set of machine learning program transformations, wherein the compiler is further configured to transform a subset of primitive operations based on the respective transformation rules associated with a machine learning program transformation identified in the code set.

7. The processing system of claim 6, wherein the set of machine learning program transformations comprise grad, backward, or autograd.

8. The processing system of claim 1, wherein the compiler is further configured to select an executor for each subset of primitive operations from a plurality of executors, wherein the executor fusion is associated with the selected executor.

9. The processing system of claim 1, wherein the sequence of primitive operations comprise a broadcast operation.

10. The processing system of claim 1, wherein each device kernel is configured to run on a specific hardware accelerator, wherein the hardware accelerator can comprise at least one of: a graphics processing unit (GPU), a central processing unit (CPU), a tensor processing unit (TPU), an infrastructure unit (IPU), or a neural processing unit (NPU).

11. A method comprising:
   determining a set of proxy inputs sharing an input parameter set with the set of inputs for a code set;
   generating a preliminary trace from the plurality of program instructions using the set of proxy inputs, the preliminary trace comprising a set of sequential operations on the set of proxy inputs;
   decomposing each operation within the set of sequential operations into a set of primitives;
   generating an execution trace, comprising replacing subsets of primitives from the decomposed operations with executor fusions associated with a device kernel; and
   caching the execution trace in association with the input parameter set, wherein execution traces are retrieved based on the input parameter set and executed in response to a call to execute the code set.

12. The method of claim 11, further comprising:
   determining a set of control flows from the code set;
   wherein a different set of proxy inputs, a different preliminary trace, and a different execution trace is generated for each of the set of control flows.

13. The method of claim 11, wherein generating the execution trace further comprises selecting an executor for each subset of primitives from a plurality of executors, wherein the executor function and the device kernel are associated with the selected executor.

14. The method of claim 11, wherein the code set and the execution trace comprise the same formal language.

15. The method of claim 11, wherein generating the preliminary trace is performed without computation on a hardware accelerator.

16. The method of claim 15, wherein each proxy input lacks data values and wherein each input has a data value.

17. The method of claim 15, wherein the input parameters comprise at least one of shape, device, dtype, or whether the proxy requires grad.

18. The method of claim 11, wherein the device kernel comprises a Compute Unified Device Architecture (CUDA) CUDA kernel.

19. The method of claim 11, further comprising generating an intermediate trace using a machine learning program transformation, wherein the execution trace is generated from the intermediate trace.

20. The method of claim 11, wherein each primitive is associated with a transformation rule for each of a set of machine learning program transformations, wherein generating the execution trace further comprises transforming primitives from the decomposed operations based on the respective transformation rules associated with machine learning program transformations within the code set.

* * * * *

UNITED STATES PATENT AND TRADEMARK OFFICE
CERTIFICATE OF CORRECTION

PATENT NO. : 12,288,050 B2
APPLICATION NO. : 18/752104
DATED : April 29, 2025
INVENTOR(S) : Thomas Viehmann, Luca Antiga and Michael Ruberry Page 1 of 1

It is certified that error appears in the above-identified patent and that said Letters Patent is hereby corrected as shown below:

In the Claims

Column 26, Claim 18, Line 40, before "kernel.", delete "CUDA"

Signed and Sealed this
Third Day of June, 2025

Coke Morgan Stewart
*Acting Director of the United States Patent and Trademark Office*